Figure 1:
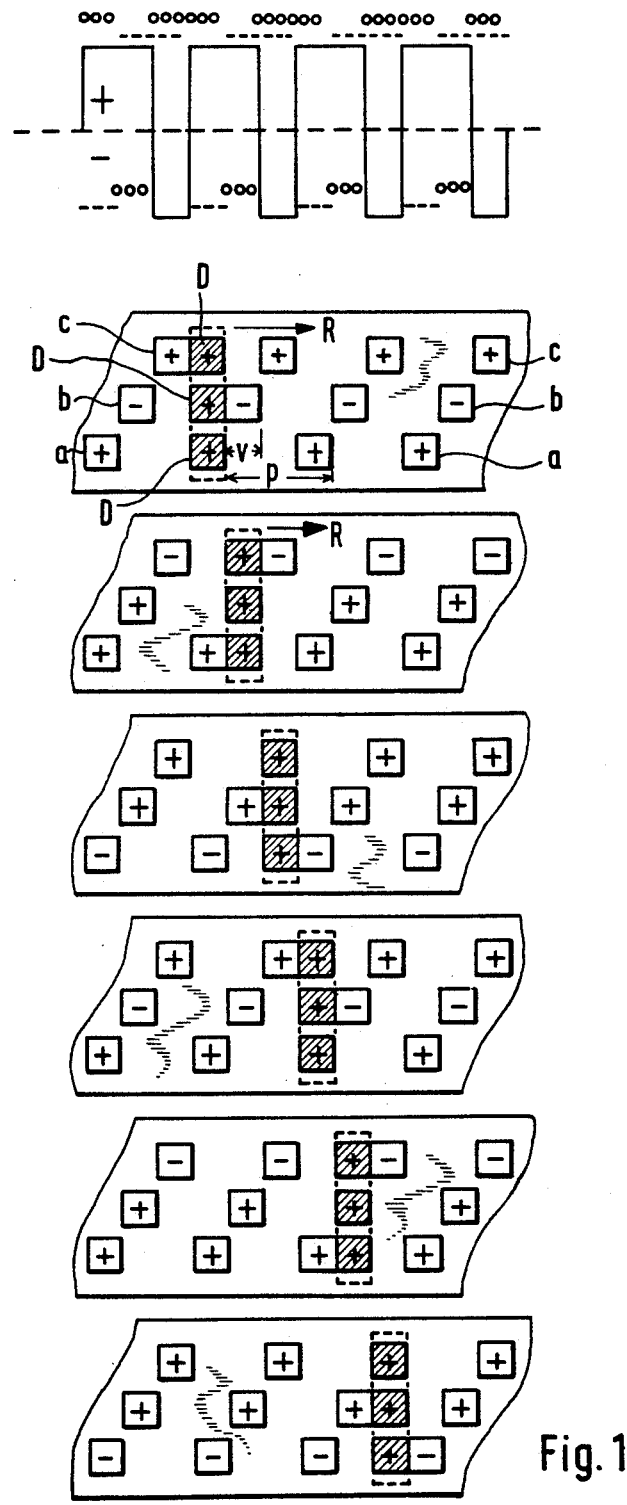

United States Patent [19]
Kling

[11] 4,126,797
[45] Nov. 21, 1978

[54] ELECTROMAGNETIC DRIVING DEVICE

[76] Inventor: Alberto Kling, Seestrasse 38, D-8131 Berg, Fed. Rep. of Germany

[21] Appl. No.: 742,503

[22] Filed: Nov. 16, 1976

[30] Foreign Application Priority Data

May 24, 1976 [DE] Fed. Rep. of Germany ....... 2623234

[51] Int. Cl.² .............................................. H02K 37/00
[52] U.S. Cl. ........................................ 310/46; 310/12
[58] Field of Search ............... 318/135, 121, 138, 259, 318/132; 310/12–14, 46, 112

[56]       References Cited
         U.S. PATENT DOCUMENTS

| | | | |
|---|---|---|---|
| 1,666,065 | 4/1928 | Anderson | 310/46 |
| 1,863,294 | 6/1932 | Bogia | 310/46 |
| 2,124,672 | 7/1938 | Pershing, Jr. | 310/46 |
| 2,408,375 | 10/1946 | Collins | 310/46 |
| 3,497,730 | 2/1970 | Doolittle | 310/13 |
| 3,575,650 | 4/1971 | Fengler | 318/135 |
| 3,761,747 | 9/1973 | Allaigre | 310/13 |
| 3,867,676 | 2/1975 | Chai et al. | 318/135 |
| 3,894,275 | 7/1975 | Baumans et al. | 318/38 |
| 3,904,941 | 9/1975 | Matsui et al. | 318/135 |
| 3,962,593 | 6/1976 | Bowen | 310/114 X |

Primary Examiner—Donovan F. Duggan
Attorney, Agent, or Firm—Stevens, Davis, Miller & Mosher

[57] ABSTRACT

An electromagnetic driving device which includes two parts which are movable relative to one another, each part supporting a plurality of magnetic poles which act together with the magnetic poles of the other respective part to produce a force causing a relative movement of the parts. The poles of at least one part are designed as electromagnetic poles whose magnetic polarization is controlled. The poles of at least one part are arranged in at least three groups extending in the direction of relative movement and the pole spacings within each group, measured in the direction of relative movement, being constant and of equal magnitude in all groups. The poles of the other respective part which cooperate with the poles disposed in groups are arranged in at least one grouping which extends at an angle to the direction of relative movement and which traverses the entire width covered by the pole groups of said first part.

25 Claims, 39 Drawing Figures

Fig. 5
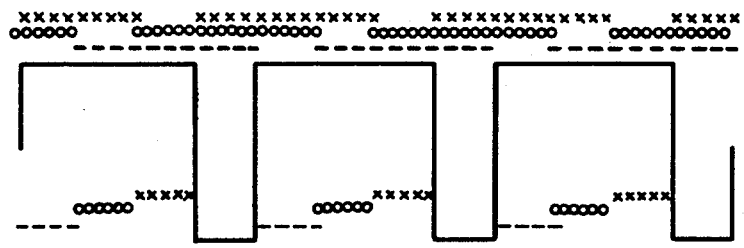
Fig. 5a
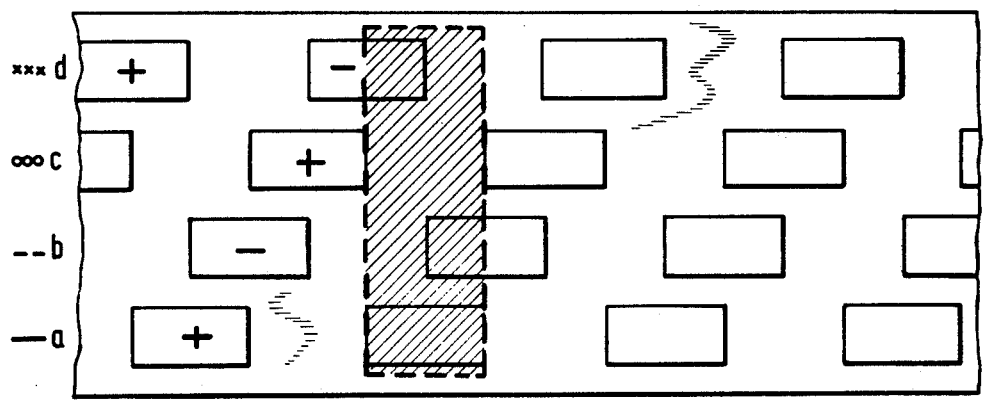
Fig. 5b
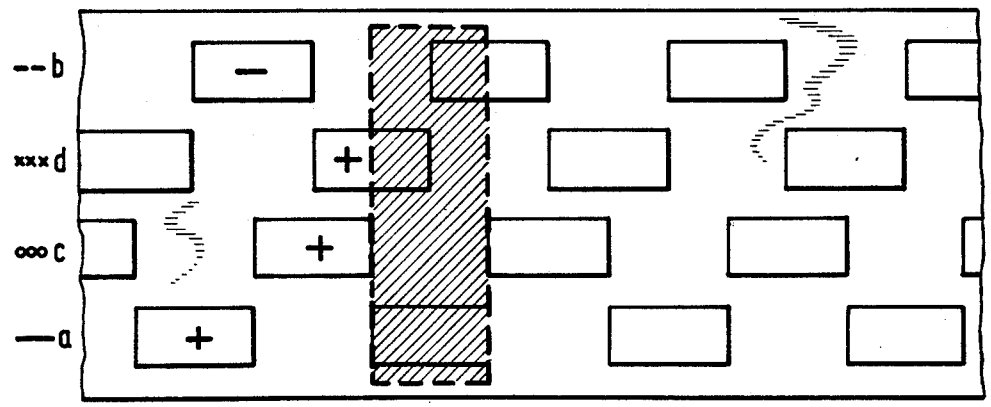
Fig. 5c

Fig. 6
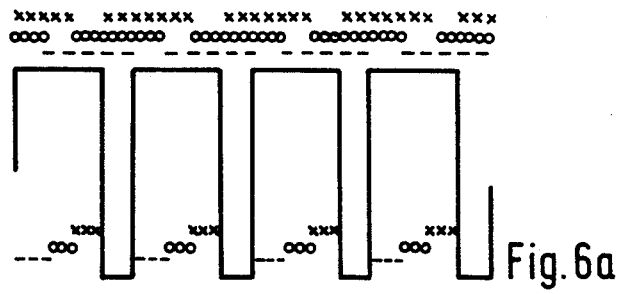
Fig. 6a
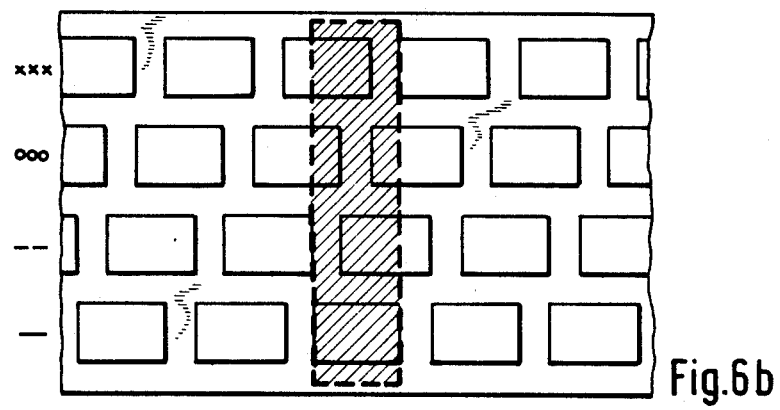
Fig. 6b
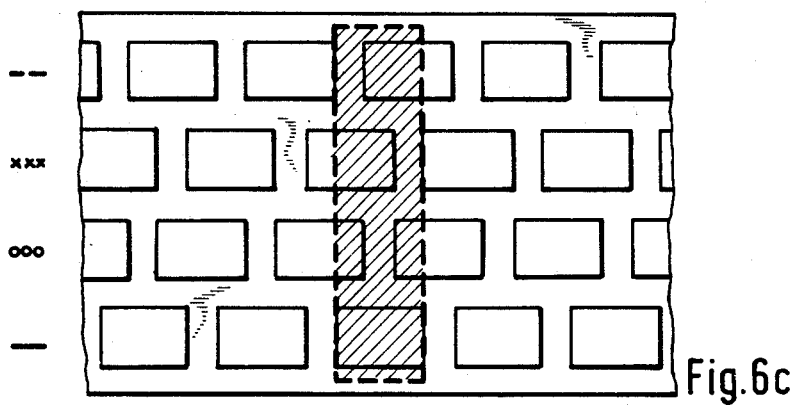
Fig. 6c

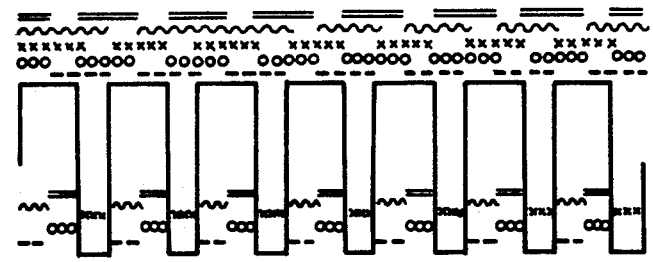
Fig. 8
Fig. 8a
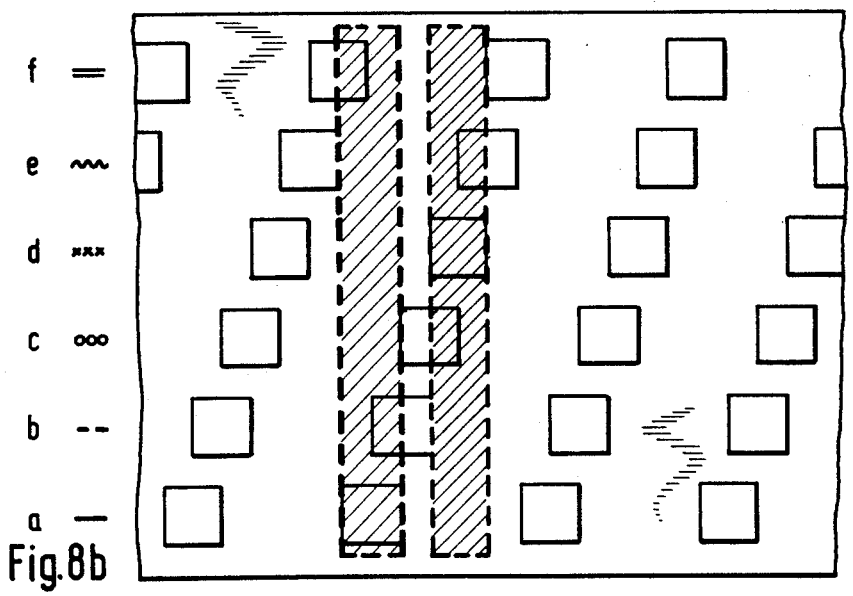
Fig. 8b
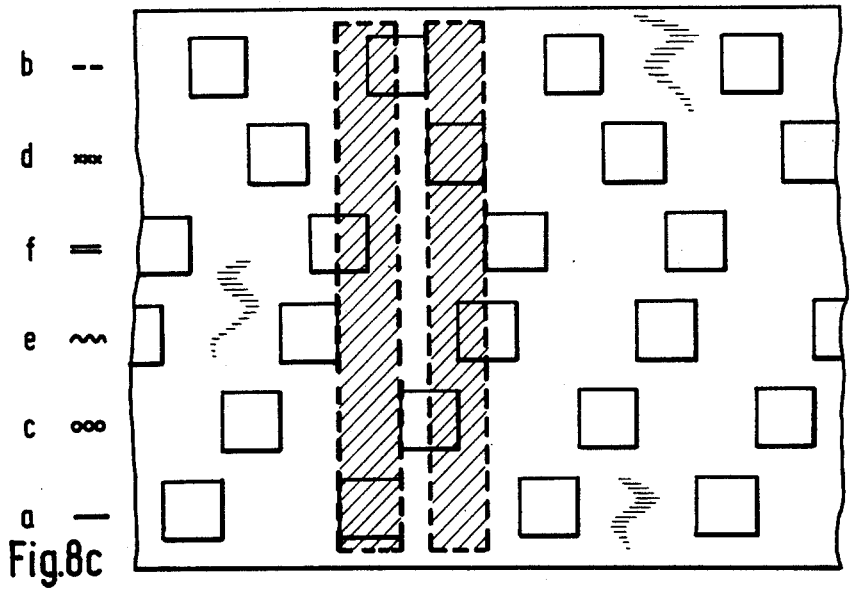
Fig. 8c

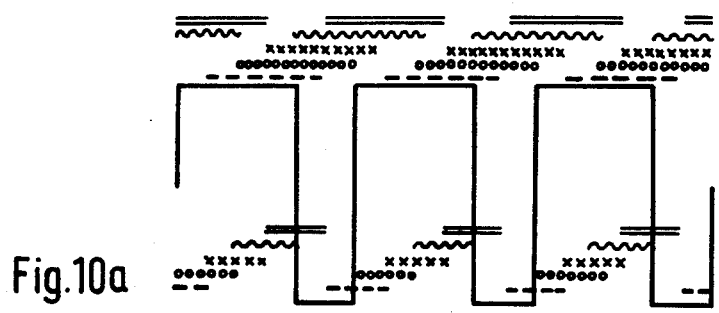
Fig. 10
Fig. 10a
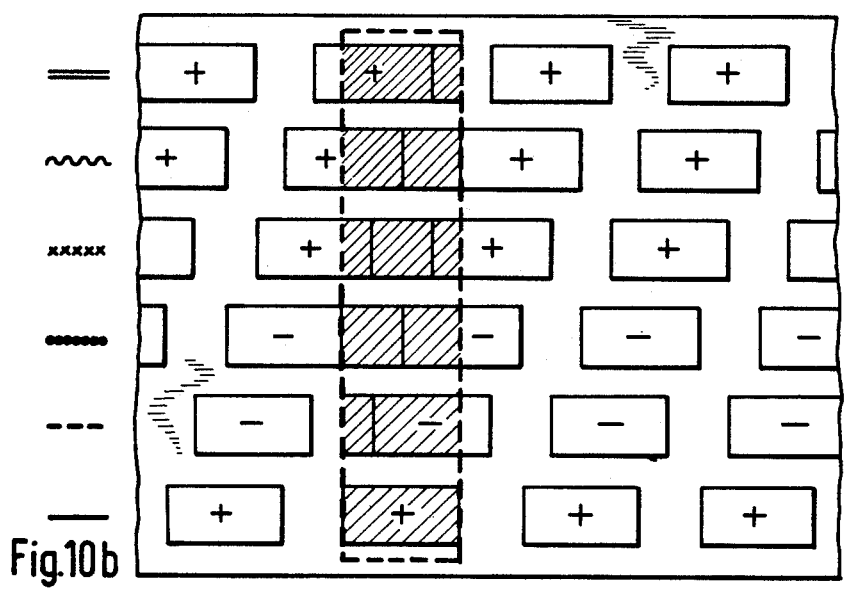
Fig. 10b
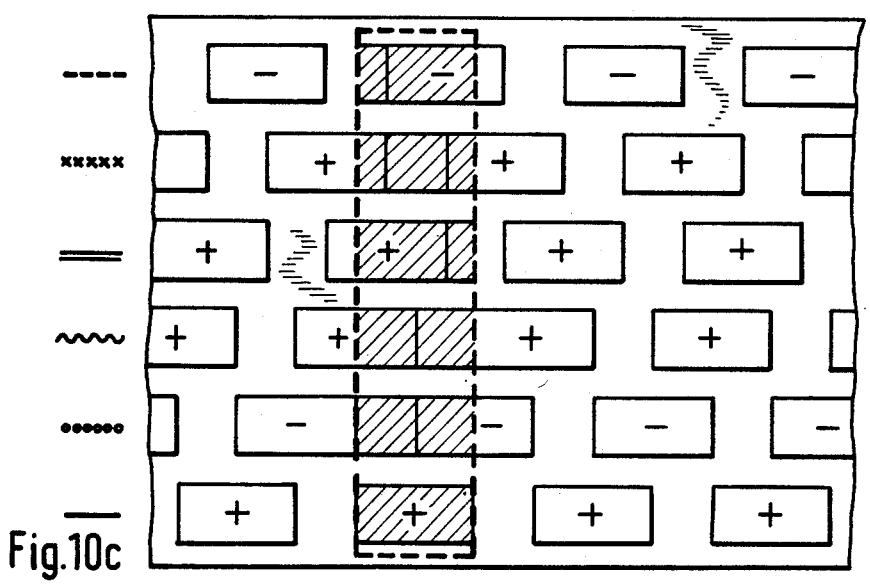
Fig. 10c

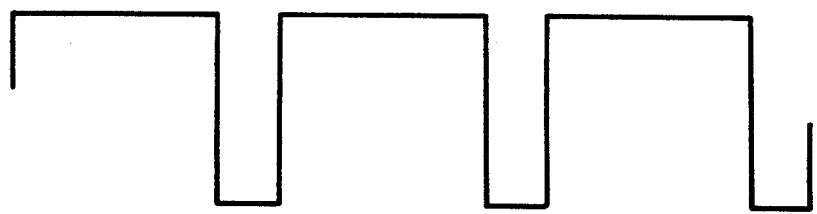
Fig.12
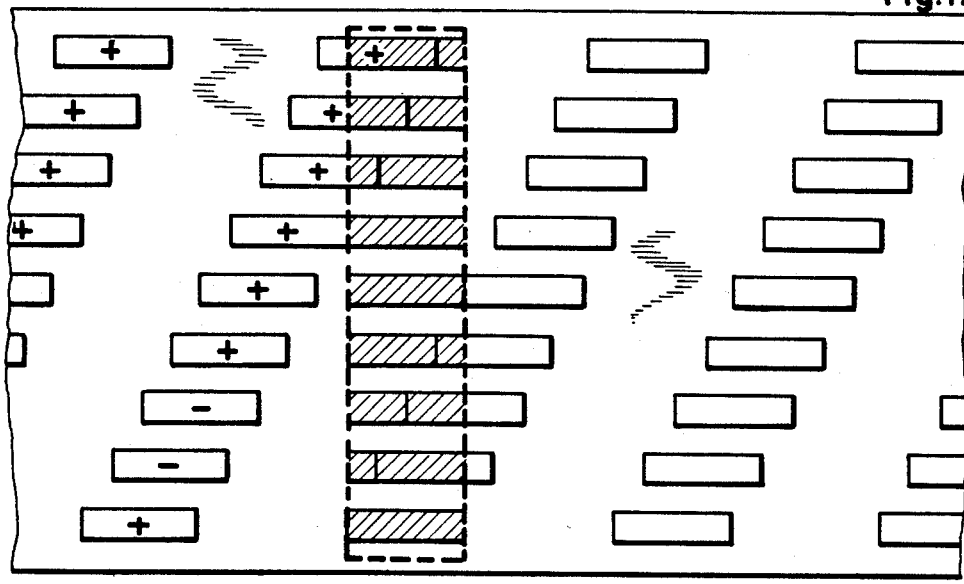
Fig.13
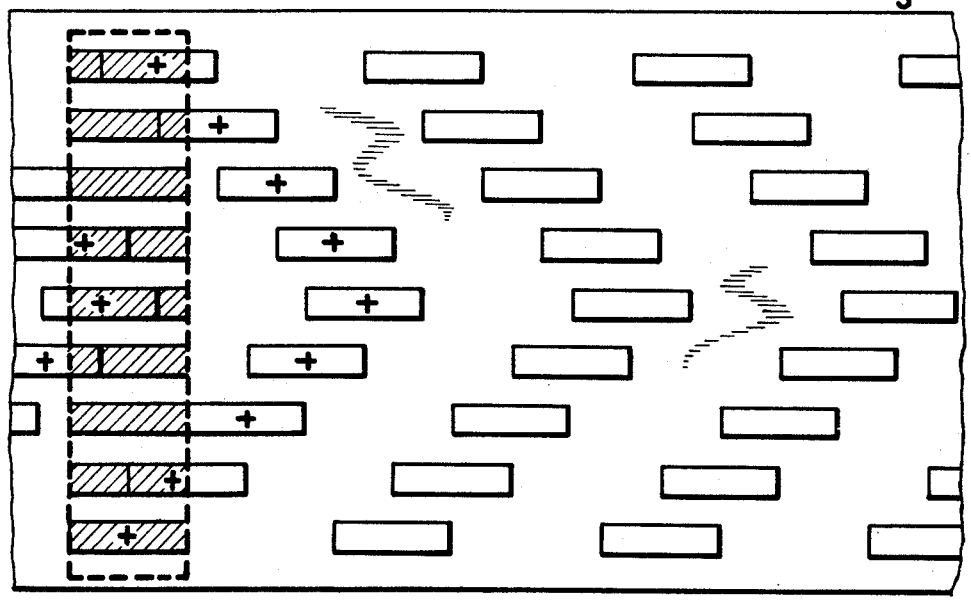

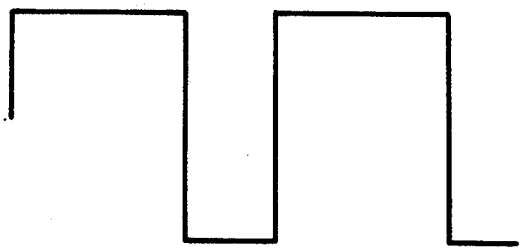
Fig.14
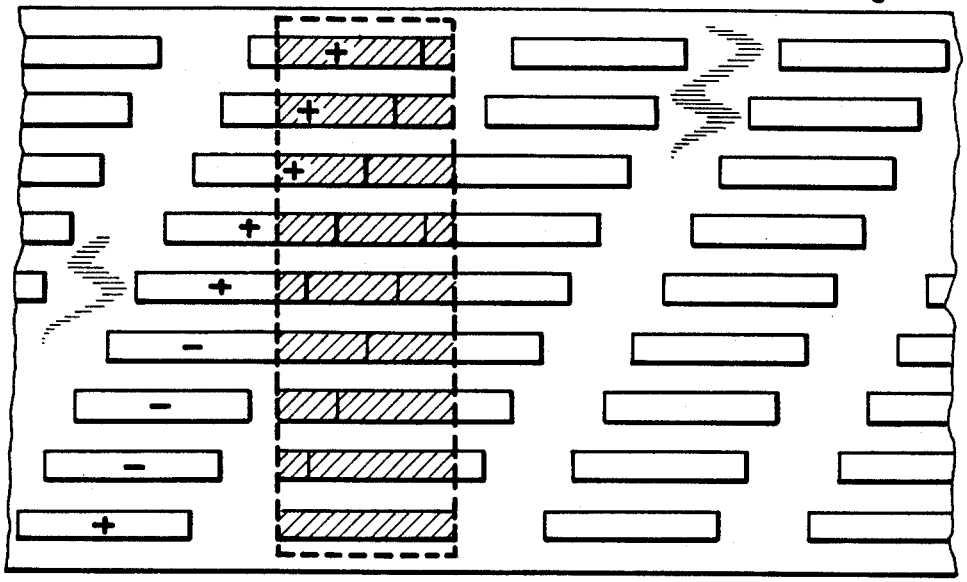
Fig.15
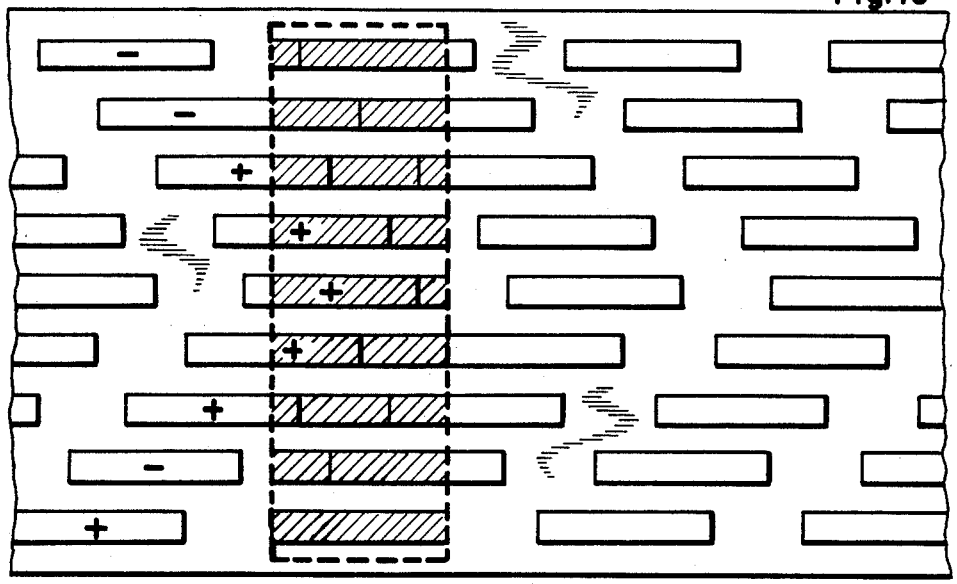

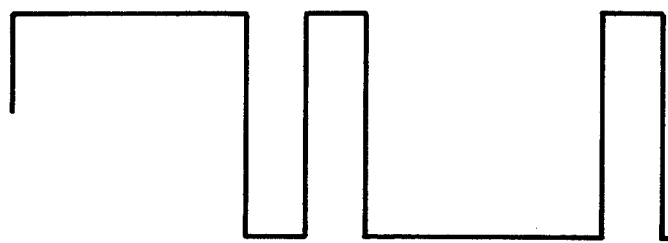
Fig.18
Fig.18a
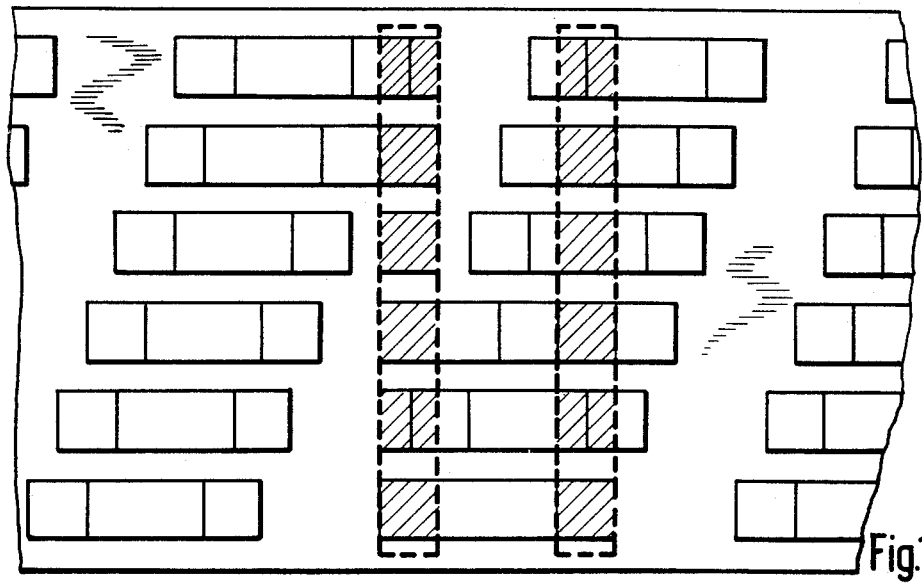
Fig.18b
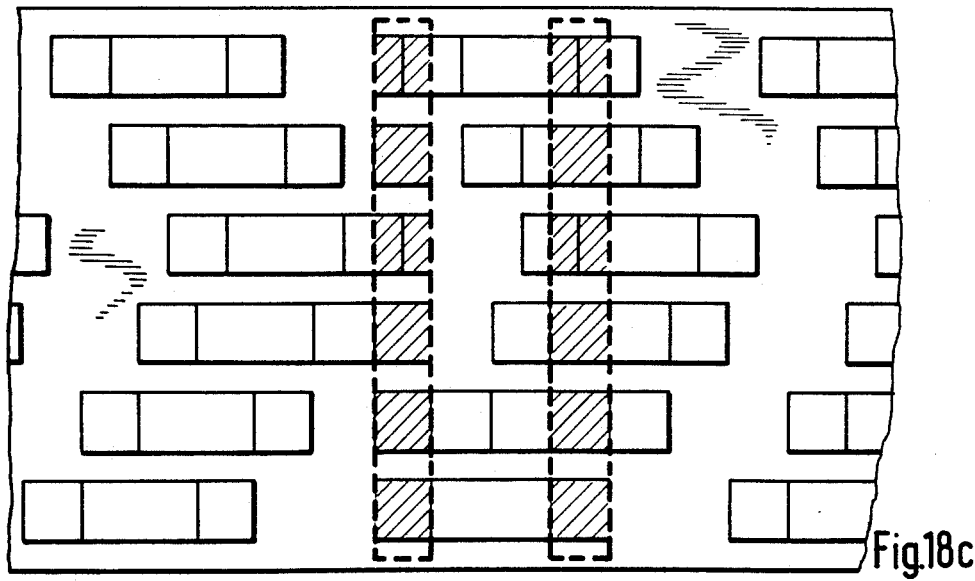
Fig.18c

ELECTROMAGNETIC DRIVING DEVICE

This invention relates to an electromagnetic driving device comprising two parts which are movable relative to one another. Each part supports a plurality of magnetic poles which act together with the magnetic poles of the other respective part to produce a force causing a relative movement of the parts. The poles of at least one part are designed as electromagnetic poles whose magnetic polarization is controlled. The poles of at least one part are arranged in at least three groups extending in the direction of relative movement with the pole spacings within each group, measured in the direction of relative movement, being constant and of equal magnitude in all groups, and the poles of the other respective part which cooperate with the poles disposed in groups being arranged in at least one grouping which extends at an angle to the direction of relative movement and which traverses the entire width covered by the pole groups of the first part. The poles of each group of said first part being displaced relative to the poles of the group immediately preceding it in the polarity change sequence by a displacement distance proceeding from the direction of inclination of the pole grouping of the second part, measured parallel to the direction of relative movement and corresponding to a whole fraction of the pole distance of poles within each group which succeed one another in the direction of relative movement (pole pitch), but corresponding to at least the quotient of the pole pitch and the total number of groups.

German Offenlegungsschrift No. (laying-open print) 1,958,632 recites a driving device of the type explained at the outset for producing rectilinear movement, in which the electromagnetic poles are excited by means of a single-phase or three-phase alternating current. It is termed a linear motor. In this construction, the polarization of the electromagnetic poles is necessarily subject to a time sequence which is predetermined by the frequency of the alternating current, irrespective of whether the relative movement of the mutually moving parts of the driving device conforms with this time sequence of polarization. In order to move the one part of the known linear motor relative to the poles of the other part functioning as the stator, magnetic forces are required which are dependent on the mass and the desired acceleration or speed of the part moved. When magnetizing the poles controlled according to a law solely dependent on time in the case of the known linear motor, a local phase shift between the maximum polarization of the magnetic poles in one specific sense of polarity and the magnetic poles of the stator will always exist during a movement of the movable part such that the movable part will lag behind with what is termed "slip" as is generally known from electric motors. In other words, during the movement of the movable part relative to the stator the maximum polarization does not occur in the poles of the movable part when they are located opposite the poles of the stator, but rather at a locally displaced location. The "slip" during the movement of the movable part becomes increasingly greater the greater the required forces are which are necessary to move the movable part. If the required forces become too great, the slip also becomes too great so that there is not longer any coordinated magnetic attraction between the stator and the movable part. The movable part will then be accelerated in an irregular and uncontrolled fashion and will no longer be moved in the desired, uninterrupted movement. The known linear motor is therefore seriously restricted in its range of operation to a narrow range of speed defined by the design properties of the motor and to a very narrow performance range.

The invention therefore has as an object to provide a driving device of the type explained at the outset which guarantees a drive which is variable over a wide range of speeds and a wide performance range in addition to simple construction and economical production.

This object is accomplished in accordance with the invention in that the electromagnetic poles of the one part are simultaneously changeable in polarity, that the current input of each electromagnetic pole of the one part is controlled such that a polarity change to the same polarity as in a cooperating pole of constant polarity of the other part takes place at the very instant at which this cooperating pole comes to a position opposite the pole to be changed after having moved toward it, and that a polarity change to a polarity opposite the polarity of the cooperating poles of constant polarity of the other part takes place, in dependence of whether the succeeding poles of each pole group all have the same or alternately opposite polarity at each moment, at the very instant at which the pole of constant polarity which moves towards the electromagnetic pole to be changed is positioned at a distance from the pole to be changed which permits a magnetic force of attraction to be effective.

The driving device in accordance with the invention has substantial advantages as compared to the prior art. In the driving device in accordance with the invention, the polarity of the poles is not controlled according to a predetermined time sequence irrespective of the local relative position of the relatively movable parts, but exclusively in response to the relative position of the parts, i.e., the relative position of the poles supporting the parts with respect to one another, to be more exact. In this way, it is ensured that each pole of the moved part, as long as it is moved towards one pole of the other part within the immediate vicinity thereof, has a polarity opposite the pole of the other part so that forces of attraction are active during the approach of the poles and that a change in polarity does not occur until the poles moved relatively to one another come in opposition so that, during further movement, i.e., when the pole of the other part moves away from the respective pole of the stationary part, forces of repulsion can become active which contribute equally and in full scope to the drive. This polarity control is independent of the relative speed of the parts which are moving toward one another. Hence, there is no "slip" between the relative moving parts in the driving device in accordance with the invention. The driving device in accordance with the invention is thus capable of supplying drive outputs in a very wide power range with an efficiency which remains constant over the performance range. The drive speed produced is dependent on the drive output to be supplied and on the strength of the current input which itself can be controlled. In the driving device in accordance with the invention, a single-phase or three-phase alternating current is not used to supply the electromagnetic poles, but rather the magnetic poles are supplied with a current having a specific sign in dependence of the respective relative position of the poles. In so doing, it is also possible for example to execute the control by means of two direct currents with opposite signs which are supplied alternately to the magnetic poles in the time intervals specified by the relative position of the poles. The driving device in accordance with the invention is of simple construction and easy to control and it also permits a reliable drive over a wide performance range and a wide range of speeds.

An advantageous further development of the driving device in accordance with the invention is that the electromagnetic poles of the one part in each pole group all have the same polarity at every moment and cooperate with another part, in which the poles of constant polarity within each pole group have the same polarity, and that the electromagnetic poles of the one part are controlled such that a change of polarity to a polarity opposite to that of the cooperating poles of constant polarity of the other part respectively occurs at a time at which the center of the pole of constant polarity which is moved toward the electromagnetic pole to be changed is located at a distance from the center of the pole to be changed which corresponds to the displacement distance between the changeable poles of groups immediately succeeding one another in the change sequence. In this development, the movable part of the device, for example, can be provided with poles of constant and mutually equal polarity which are arranged in a grouping extending transversely to pole groups of the other part which extend in the direction of movement. The other part can be designed as a stator whose pole groups are constructed as electromagnetic poles which are supplied with a current having a specific sign in dependence of the relative position of the two parts with respect to the partial segments required in each case. In this development, the individual poles constitute singular poles which change their polarity respectively with a change in the current input.

Another advantageous further development of the device in accordance with the invention is given in that the electromagnetic poles of the one part in each pole group all have the same polarity at every moment and cooperate with another part in which the poles of constant polarity within each pole group alternately have opposite polarity. The electromagnetic poles of the one part are controlled such that the polarity is changed to a polarity opposite the polarity of the cooperating poles of constant polarity of the other part at the very instant at which the pole of constant polarity which is moved toward the pole to be changed is located at a distance in front of the pole to be changed which corresponds to the pole pitch of the poles of constant polarity. In this development one part of the driving device, for example, can be designed as a movable part and be provided with a pole grouping in which two poles of opposite polarity respectively form a permanent magnetic dipole pair, the line connecting the poles of each dipole running parallel to the direction of movement of said part. For instance, each dipole can be constructed as a U-shaped permanent magnet, the two legs of the magnet forming poles of opposite polarity. The poles of the other part of the development of the driving device, which can then be designed as a stator, constitute singular poles in this development which change their polarity according to the current input. In this development, one respective dipole pair of the movable part moves along and over one respective pole group of the stationary part.

Yet another advantageous further development of the driving device in accordance with the invention is achieved in that the electromagnetic poles of the one part in each group extending in the direction of movement alternately have opposite polarity and are controlled such that the polarity is changed to a polarity opposite the polarity of the cooperating poles of constant polarity of the other part at the very instant at which the center of the pole of constant polarity which is moved toward the electromagnetic pole to be changed is located at a distance in front of the center of the pole to be changed which corresponds to the pole pitch of the poles of changeable polarity. In this construction two succeeding electromagnetic poles in each pole group of the one part can be designed as poles of a magnet dipole respectively, e.g. as the legs of a U-shaped core of magnetiziable material which is wound with a conductor coil which can be suppled with current to magnetize it in a known manner. The other part can be designed as a movable part which supports a pole grouping of poles of constant polarity which extends transversely to the pole groups of the first part, either all poles having the same polarity or, for example, one respective pole group of the second movable part which consists of two permanent magnetic poles of constant opposite polarity cooperating with each pole group of the first part. Two poles of opposite polarity could respectively form the poles of a permanent magnet dipole, in particular a U-shaped permanent magnet dipole.

A very clear structure of the driving device in accordance with the invention is achieved in that each pole group of each part which extends in the direction of relative movement is designed as a pole row extending parallel to the direction of relative movement and that the individual pole rows are arranged next to one another.

The driving device in accordance with the invention is constructed particularly advantageously in that directly adjacent poles of pole groups succeeding one another immediately in the change sequence are displayed by a displacement distance resulting in an overlap, - defined as the ratio of one of those surface areas of adjacent poles of pole groups which succeed each other in the change sequence and which are overlapped by an imaginary area strip which defines lines parallel to the direction of inclination of the pole grouping of the second part, the one line being tangent to the end of the initially passed pole as seen in the direction of movement and the other line being tangent to the beginning of the pole passed thereafter of the poles following in the change sequence, compared to the total surface of a pole, of at least ¼ and of not more than the quotient of the number of the displacement distance to the bridging of a pole pitch (pole subdivision number) minus one and the pole subdivision number. Such a configuration of the driving device in accordance with the invention has the advantage that forces of attraction of the poles of the relatively approaching parts in a direction extending perpendicular to the direction of relative movement, and forces of repulsion of the poles in a direction perpendicular to the direction of relative movement are balanced out during each phase of movement of the two parts. In such a configuration of the driving device in accordance with the invention, it is therefore not necessary to support and guide the relatively approaching parts in special bearings to ensure that an air gap will remain between the cooperating poles which will permit the relative movement. In this development of the driving device in accordance with the invention, the danger that cooperating poles will attract each other so strongly when approaching each other that they will come into contact, is thus prevented. During each phase of movement, cooperating poles exert forces of repulsion on each other perpendicular to the direction of movement which are so strong that the forces of attraction of other cooperating poles perpendicular to the direction of movement are thereby compensated. In this way, a "self-supporting" and a "self-carrying" driving device is created. Special bearings which themselves cause frictional losses and, moreover, cause soiling and dirtying of the driving device since they have to be lubricated, can thus be omitted. This construction of the driving device in accordance with the invention can therefore be built very easily and rather simply and, in addition, can also be employed in fields of applications for which suitable electromotor drives have hitherto not existed, for example in drive means in which such high driving speeds are required that they could not be achieved by hitherto known driving devices whose driving speed is restricted by the bearings.

A favorable further development of the self-supporting drive device in accordance with the invention as discussed above is achieved in that the polarity of a pole to be changed and approached by a pole of constant polarity is equal to the polarity of the approaching pole of constant polarity, and that the electromagnetic poles of the one part are controlled such that the polarity of the approached pole to be changed is changed to a polarity opposite the polarity of the cooperating pole of constant polarity at the instant at which the approaching pole of constant polarity covers the pole to be changed by an amount equal to the overlap. In this development, the poles of each pole group of each of the two parts have among one another the same polarity at every moment. Hence, this is a further development of the driving device in which all the poles are designed as singular poles.

Another favorable further development of the self-supporting driving device in accordance with the invention as discussed above is given in that the polarity of a pole to be changed and approached by a pole of constant polarity is initially opposite the polarity of the approaching pole of constant polarity. The electromagnetic poles of the one part are controlled such that the polarity is changed to the same polarity as in a cooperating pole of constant polarity of the other part at the very instant at which the front edge of this pole of constant polarity coincides with the edge of the pole to be changed which lies closest in the direction of movement toward the pole to be changed. The polarity of the approached pole to be changed is changed to a polarity opposite the polarity of the cooperating pole of constant polarity at the instant at which the approaching pole of constant polarity covers the pole to be changed by an amount equal to the overlap. This development of the device must be accomplished when adjacent poles of each pole group of at least one part have alternating polarity, e.g. as the poles of magnet dipoles, in particular designed as U-core magnet dipoles.

As was already recited hereinbefore, a driving device in accordance with the invention can be designed such that all poles of each pole group of the one part are designed as singular poles, have the same polarity among themselves at every moment and are simultaneously changeable in polarity. Such singular poles can be constructed, for example, such that cores of magnetizable material are arranged in its main axis perpendicular to the direction of movement of the driving device so that one end of each core comes to lie in the area of movement of the other part and that each of these cores is wound with an electrical conductor coil to be supplied with current.

As was also already recited hereinbefore, a driving device in accordance with the invention may also be designed such that each pole of each pole group of the one part has a polarity opposite the pole of the same pole group located immediately in front of it and that adjacent poles in each pole group are respectively joined in pairs and are designed as the poles of magnetic dipoles, all magnetic dipoles in each pole group being changeable simultaneously in their polarity.

A driving device in accordance with the invention can be developed further in an advantageous fashion such that the grouping of poles of the second part extending over the width covered by the pole groups of the first part consists of individual poles of constant polarity, at least one of which is respectively disposed adjacent each pole group of the first part.

It is possible, however, to develop a driving device in accordance with the invention further in such a way that the grouping of poles of the second part extending over the width covered by the pole groups of the first part is designed as a coherent magnetic strip of constant polarity extending across the total width.

A further development of the driving device in accordance with the invention which is very simple in construction is given in that pole groups of the first part which succeed one another directly in the polarity change sequence are located directly adjacent to one another. In this further development, the polarity in the individual groups is changed in a sense extending transversely to the direction of relative movement.

Yet another favorable further development of the driving device in accordance with the invention is achieved in that pole groups which succeed one another directly in the polarity change sequence are respectively disposed alternately on both sides of a line extending in the direction of movement. In this development, the polarity of the individual succeeding pole groups is not changed in a sense which is constantly transverse to the direction of relative movement, but on the contrary the pole groups which succeed one another in the change sequence are alternately positioned on both sides of the direction of relative movement so that the polarity change sequence "hops back and forth" relative to the line extending in the direction of movement. This arrangement is advantageous in that the forces of attraction or repulsion which act between the poles of the individual pole groups and the poles of the other part cooperating therewith are distributed in an especially favorable manner approximately symmetrical to both sides of the line extending in the direction of movement, thus substantially eliminating a "lateral tipping" of the movable part about an axis extending in the direction of movement during movement in dependence of the polarity change sequence.

Another very favorable further development of the driving device in accordance with the invention is given in that pairs of driving devices are positioned symmetrically on both sides of a line of symmetry extending in the direction of movement and are combined to form a complete device. In this development, the forces of attraction and repulsion exerted on one another by the parts, which are movable relative to one another via the cooperating poles, are distributed completely symmetrically to the central axis of the device which extends parallel to the direction of movement both in a direction extending parallel to the direction of movement as well as in a direction perpendicular thereto so that even minor temporary changes of the forces of attraction and repulsion in a direction perpendicular to the direction of movement are eliminated completely.

In order to achieve an especially simple and space-saving construction and to utilize the magnetic surfaces of the magnetic poles, it is advantageous to design the driving device in accordance with the invention such that all poles of all pole groups have equally large, rectangular pole areas with two edges extending parallel to the direction of movement.

A driving device in accordance with the invention is advantageously designed so that the pole groups of the first part are disposed on a support to produce rectilinear driving movement along the desired direction of movement and that the second part is disposed so as to be movable in the direction of movement relative to th first part.

One further development of the driving device in accordance with the invention quoted above can be constructed in such a way that the pole groups of the first part are disposed on a support in one plane and the second part is movable in the direction of movement parallel to the plane at a small distance from the pole group of the first part. Such a construction can be advantageous, in particular if the driving device is to have especially small dimensions in a direction perpendicular to the direction of movement.

Another favorable design of the aforequoted further development of the driving device in accordance with the invention is achieved in that the pole groups of the first part are disposed on the inner surface of a hollow cylindrical support along the generatrices thereof and the second part is designed as a coaxial cylinder located in the hollow cylindrical support with poles arranged on the outer circumference thereof, said cylinder being coaxially movable relative to the hollow cylindrical support of the first part. The result of this further development is a substantially cylindrical driving device in a drive means extending coaxially to the cylinder.

A driving device in accordance with the invention can be constructed advantageously such that the pole groups of the first part are disposed on a support to produce a rotational movement on circles concentric to a desired imaginary axis of rotation, and that the second part is disposed to be rotatable about the desired axis of rotation relative to the first part.

An aforementioned further development of the driving device in accordance with the invention can be designed advantageously to produce a rotational movement such that the pole groups of the first part are positioned in concentric circles on a support designed as a disc whose center lies in the imaginary axis of rotation and which extends perpendicular to the imaginary axis of rotation. The second part also has a support designed as a disc which is rotatable about the axis of rotation relative to the support of the first part and on which the poles of constant polarity are located in groupings extending outwardly from the center. In this further development, the two parts of the driving device which are movable relative to one another are positioned opposite two coaxial discs which have their end surfaces facing one another and which rotate relative to one another due to the cooperation of the poles located thereon and facing each other. Such a further development can be very short in the axial direction.

Another advantageous construction of a driving device in accordance with the invention and designed to produce a rotational movement is achieved in that the pole groups of the first part are disposed on the inner surface of a hollow circular-cylindrical support whose axis coincides with the axis of rotation along inner circumferential circles in proximate position in the axial direction, and the second part is designed as a coaxial cylinder disposed in the hollow cylindrical support with poles correspondingly positioned on its outer circumference, the cylinder being supported to rotate about its axis lying in the axis of rotation relative to the first part. The result of this further development is a substantially cylindrical driving device having a drive axis positioned in the cylinder axis.

The driving device in accordance with the invention can be developed further by suitably arranging the poles of the parts which are movable relative to one another such that a drive force is respectively produced along each desired course of movement. A development of the driving device in accordance with the invention which is suitable to produce a helical-shaped drive movement is achieved advantageously, for example, in that the pole groups of the first part are disposed on the outer circumference of a circular-cylindrical support along helical lines about the cylinder axis extending in the desired direction of movement in order to produce helical movement consisting of a rectilinear component of movement and a rotational component of movement. The second part has a support designed as a hollow cylinder and concentrically encompassing the circular-cylindrical support of the first part, which supports poles of constant polarity disposed on its inner circumference corresponding to the arrangement of the pole groups of the first part and which is movable both axially as well as rotationally relative to the first part.

A simple further development of the driving device in accordance with the invention is achieved in that the current supply and polarity control of the electromagnetic poles is designed such that it is effected during the relative movement of the two parts respectively in response to the relative position of the poles of the second part with respect to the poles of the first part.

A favorable further development of the aforediscussed control means of the driving device in accordance with the invention is achieved in that one of the two parts is connected with a control contact support having sliding contacts connected with the poles to be controlled. The other of the two parts is connected with a sliding contact finger support having contact fingers which slide over the sliding contacts of the control contact support during the relative movement of the two parts, thereby producing a corresponding current input of a specific polarity of the poles to be controlled during each relative movement of the parts.

It was stated above that the driving device in accordance with the invention can be developed further both so that it produces rectilinear drive movement and so that is produces rotational movement. The driving device in accordance with the invention, however, is in no way restricted to the production of a drive movement in a constant sense of direction, but can be designed such that a reciprocating, rectilinear or rotational movement is produced. In order to produce such a reciprocating movement, the driving device is designed such that the pole groups of the one part, preferably that part forming a stator, are restricted in length and have a starting and an end pole. The control is designed such that, when the end poles of the pole groups are reached by the cooperating poles of the other movable part, there is a change in the sense that the respectively preceding poles of the pole groups of the first part are supplied with a polarity in such a manner as if they were the subsequent poles of the end poles. In this way a simple change in direction occurs in the areas of the starting and end poles respectively which causes the movable part to reverse its direction of movement and continue to return again over the pole groups of the first part in the opposite direction of movement. Such a control can be provided both in a driving device in accordance with the invention designed for rectilinear drive movement as well as in a driving device in accordance with the invention designed for rotational movement.

The polarity change of the electromagnetic poles of the driving device in accordance with the invention in response to the relative position of the approaching poles can be effected in a number of ways, for instance with means known per se. Feedback circuits influenced by switches disposed on the electromagnetic poles to be supplied and actuated by the movable part of the device upon reaching specific positions are mentioned by way of example in this context. Instead of switches at the locations of the individual electromagnetic poles, other sensors may be employed as well, e.g. electric coils, Hall effect sensors, or optical means by means of which the respective position of the movable part can be detected relative to the first part of the device in accordance with the invention and can be utilized to control the current input.

Figure 2:
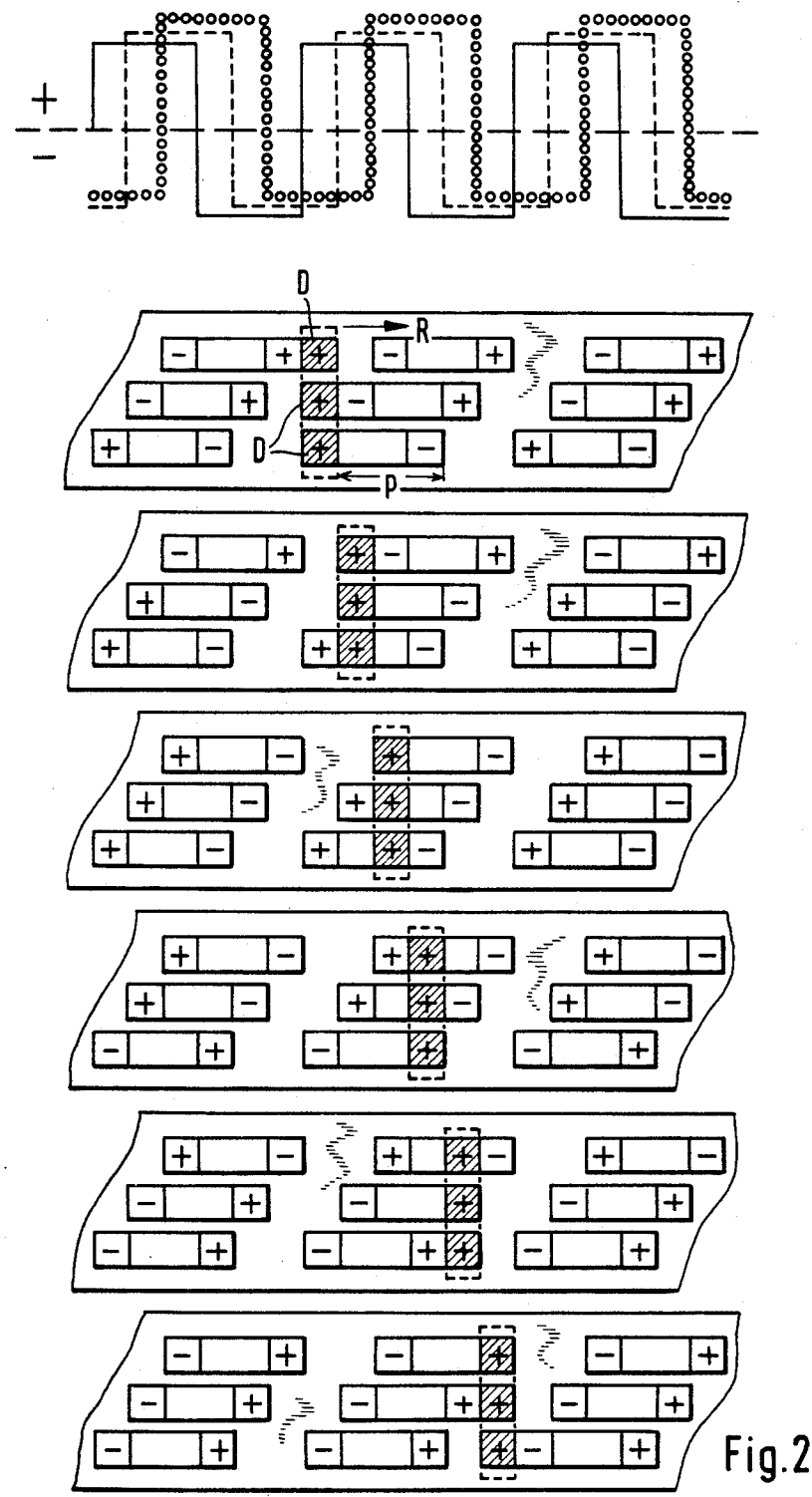
Figure 3:
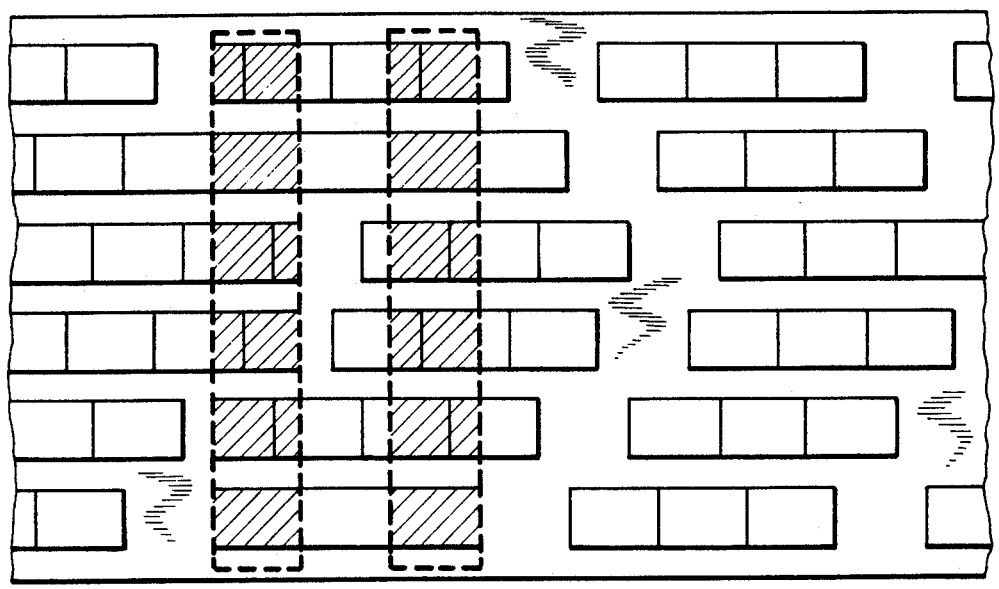
Figure 3:
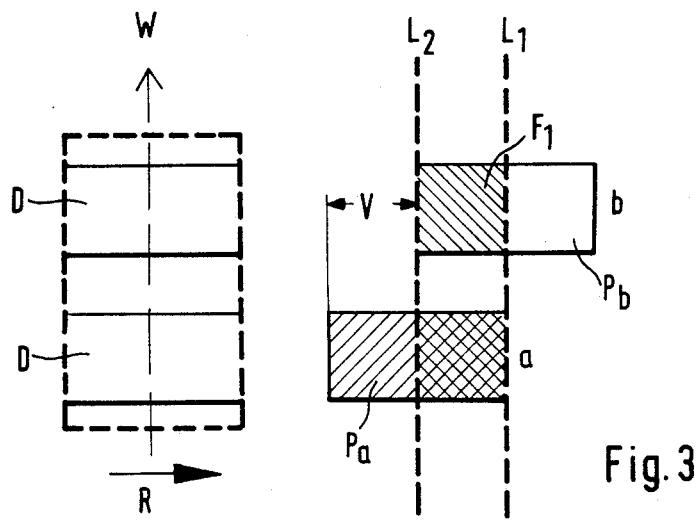
Figure 4:
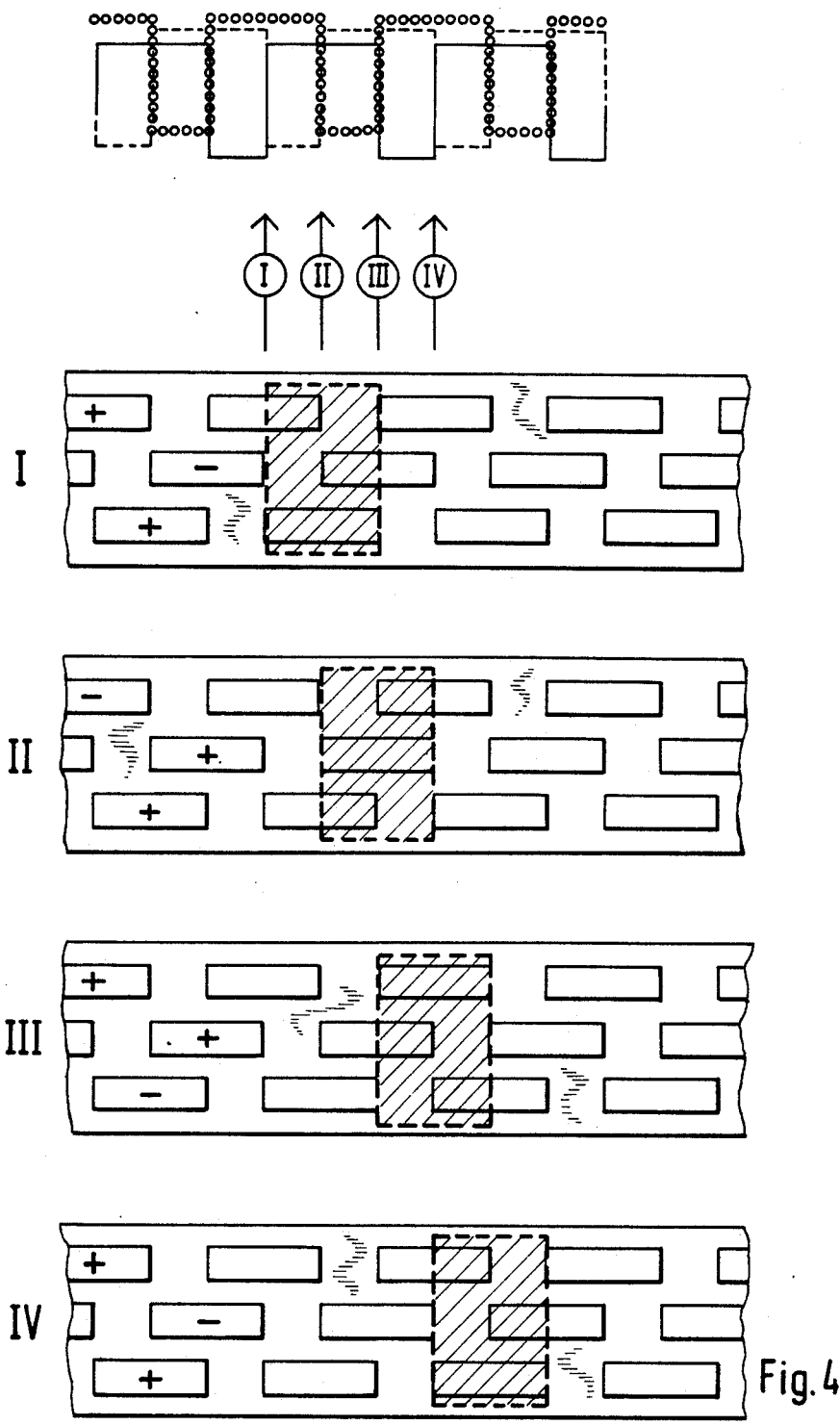
Figure 7:
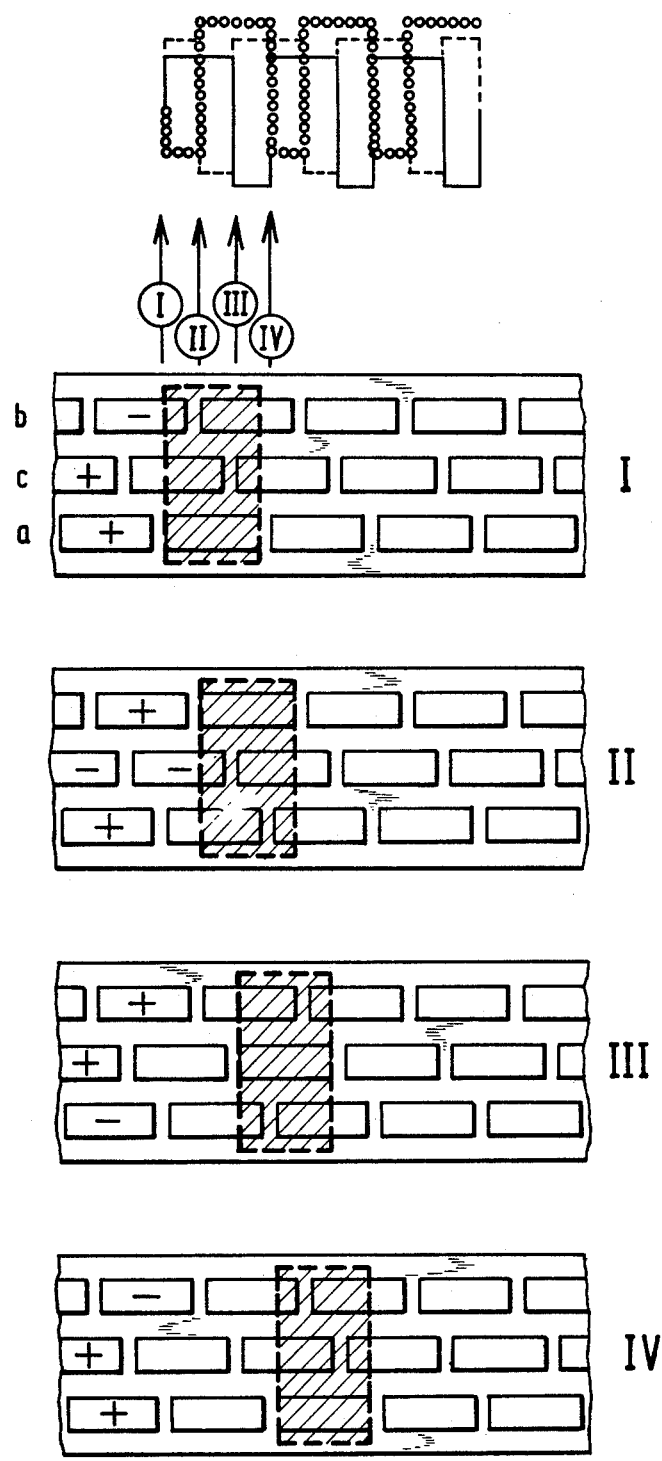
Figure 9:
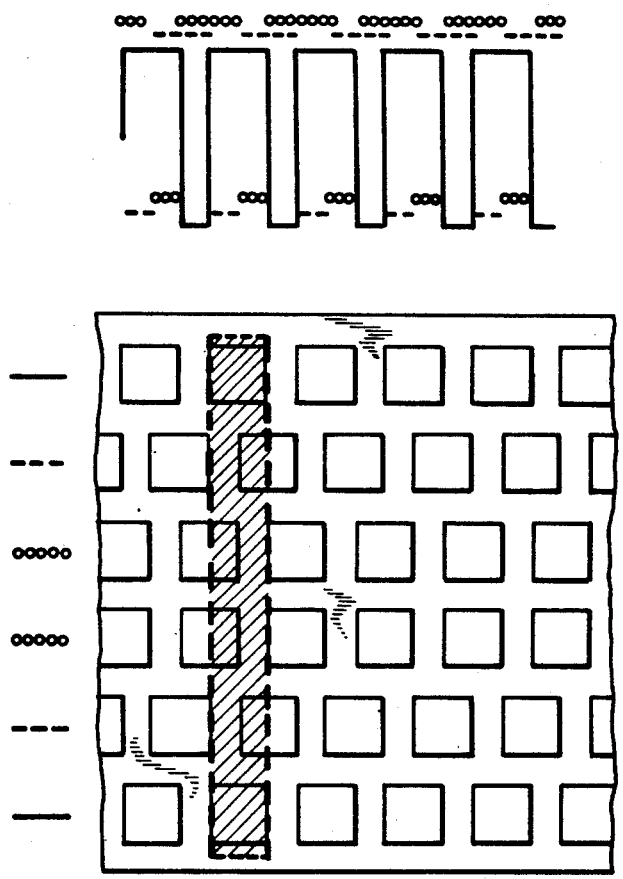
Figure 11:
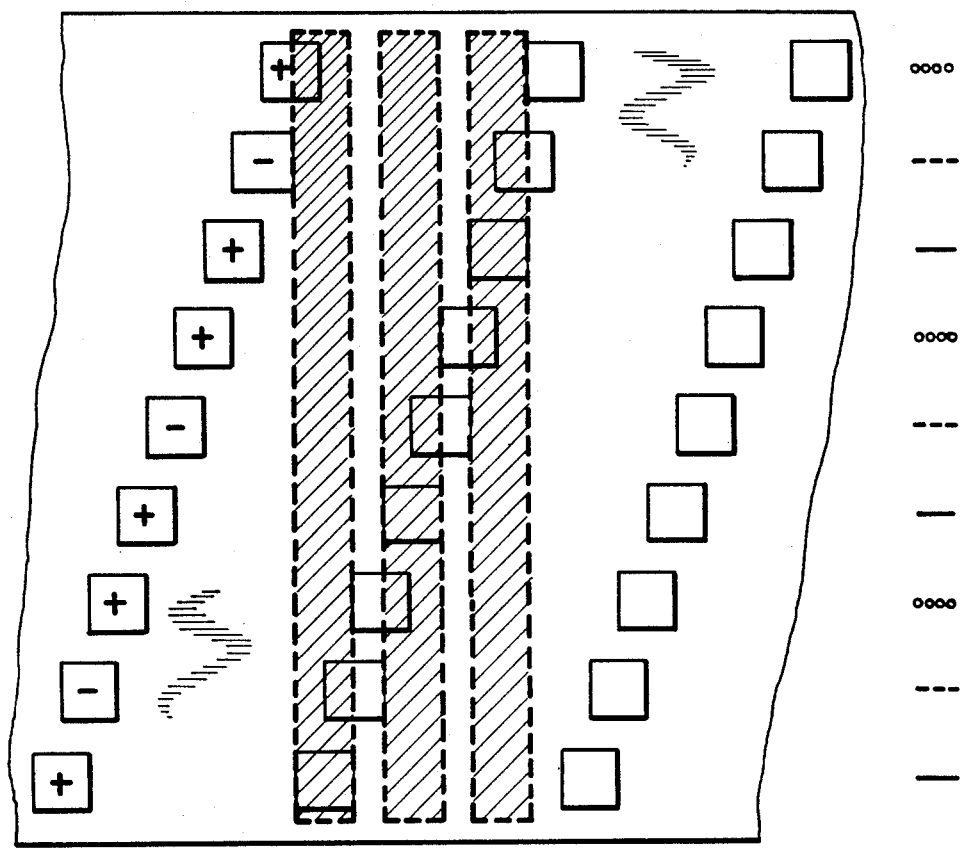
Figure 11:
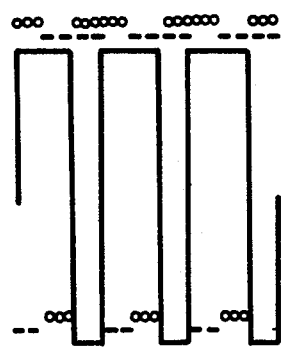

The following embodiments of the driving device in accordance with the invention will be described in conjunction with the drawings in which:

FIG. 1 is a first embodiment of a driving device in accordance with the invention which is adapted to produce linear movement, FIG. 2 is a second embodiment of a driving device in accordance with the invention which is adapted to produce linear movement, FIG. 3 is a schematic illustration of pole groups which succeed one another immediately in the change sequence illustrating the definition of the overlap ratio, FIG. 4 is a third embodiment of a driving device in accordance with the invention having three pole groups and adapted to produce linear movement, FIGS. 5a, 5b and 5c are a fourth embodiment of a driving device in accordance with the invention having four pole groups and adapted to produce linear movement, FIGS. 6a, 6b and 6c are a fifth embodiment of a driving device in accordance with the invention having four pole groups and adapted to produce linear movement, FIG. 7 is a sixth embodiment of a driving device in accordance with the invention having three pole groups and adapted to produce linear movement, FIGS. 8a, 8b and 8c are a seventh embodiment of a driving device in accordance with the invention having six pole groups and adapted to produce linear movement, FIG. 9 is an eighth embodiment wherein a pair of driving devices in accordance with the invention having three pole groups each disposed symmetrically with respect to both sides of a line of symmetry extending in the direction of movement, FIGS. 10a, 10b and 10c are a ninth embodiment of a driving device in accordance with the invention having six pole groups and adapted to produce linear movement, FIG. 11 is a tenth embodiment of a driving device in accordance with the invention having nine pole groups and adapted to produce linear movement, FIG. 12 is an eleventh embodiment of a driving device in accordance with the invention having nine pole groups and adapted to produce linear movement, FIG. 13 is a twelfth embodiment of a driving device in accordance with the invention having nine pole groups and adapted to produce linear movement, FIG. 14 is a thirteenth embodiment of a driving device in accordance with the invention having nine pole groups and adapted to produce linear movement.

Figure 17:
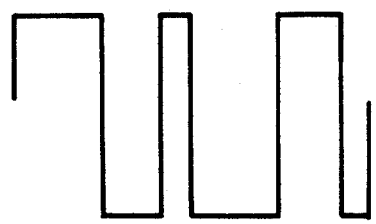
Figure 16:
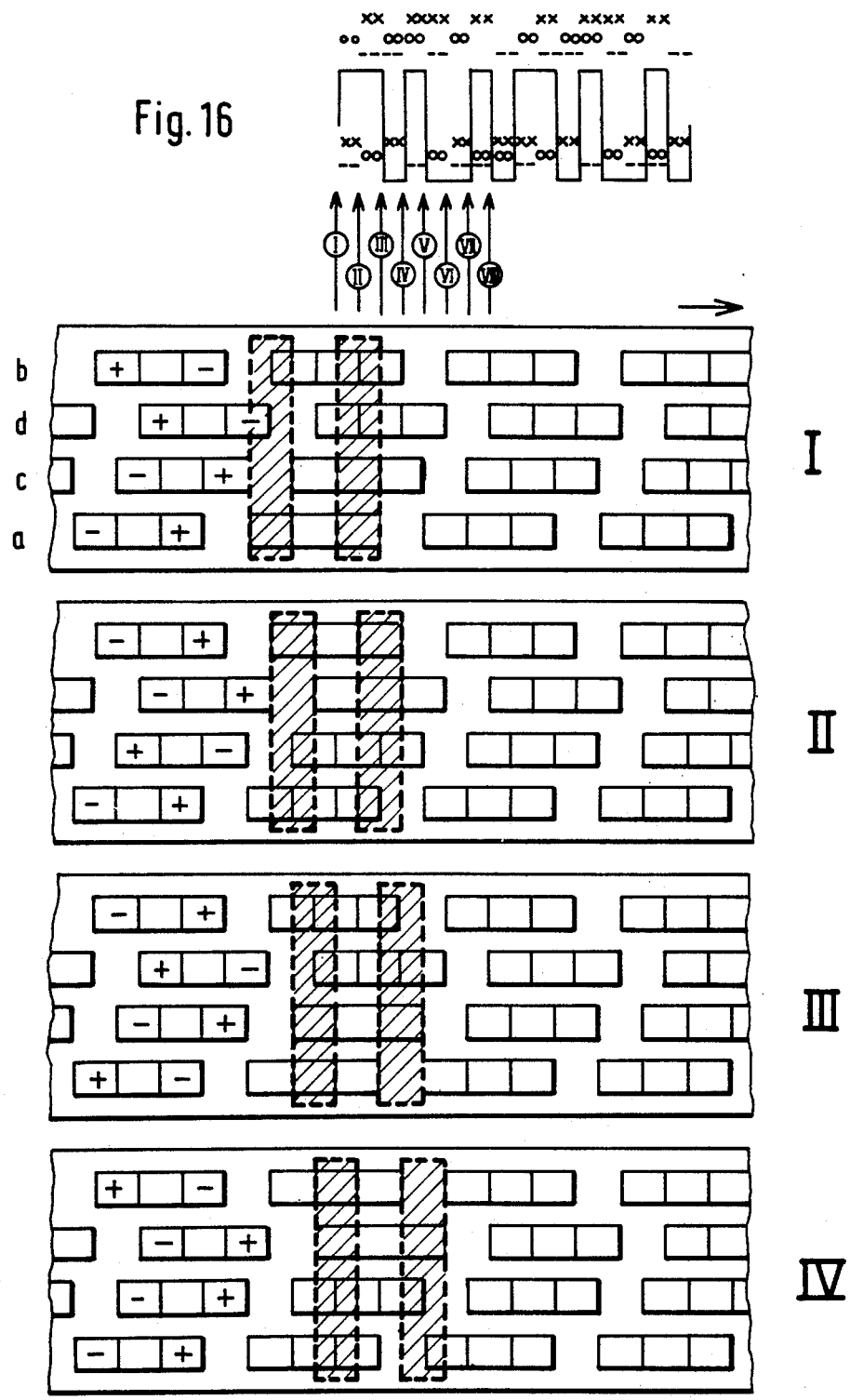
Figure 16:
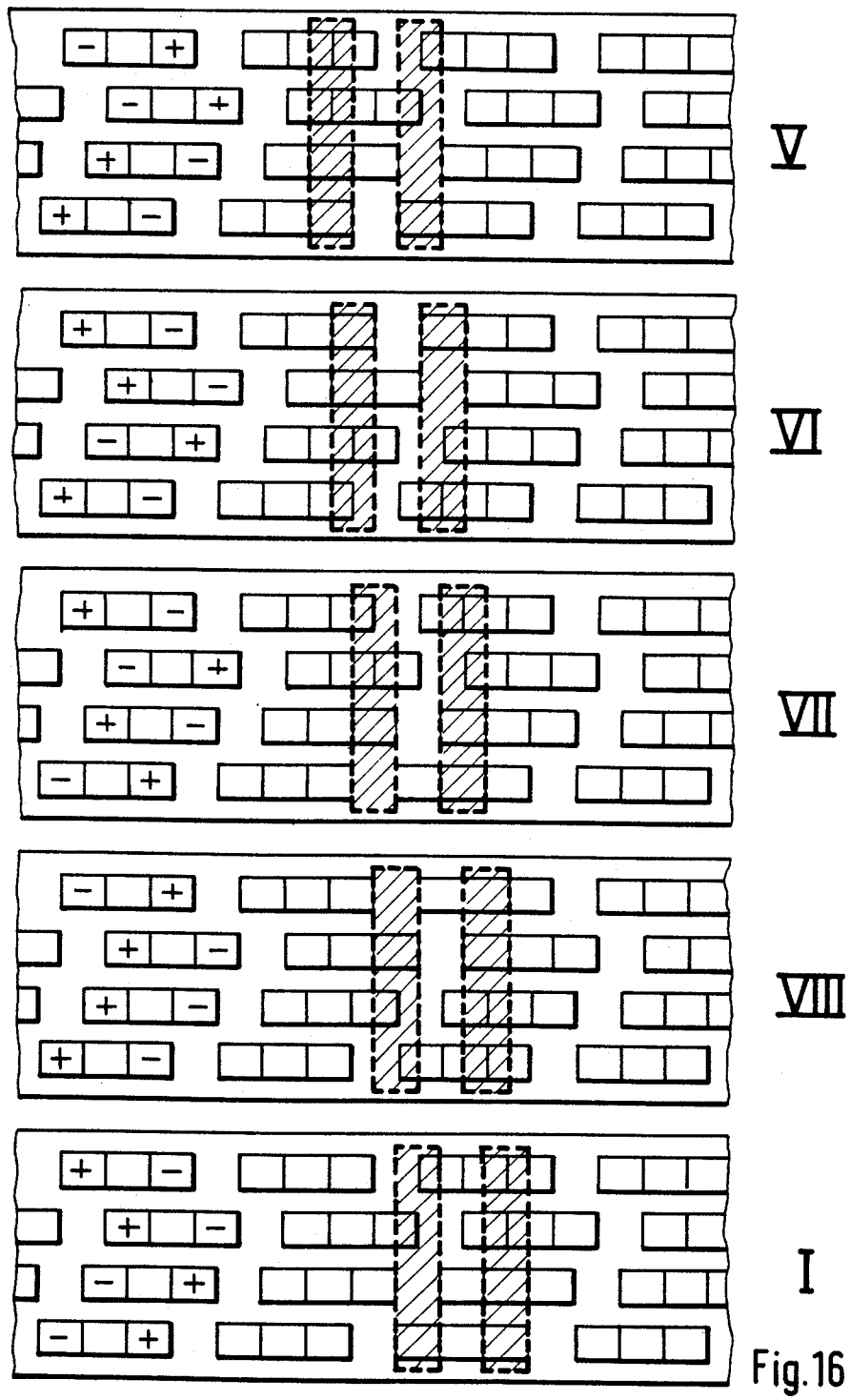
Figure 19:
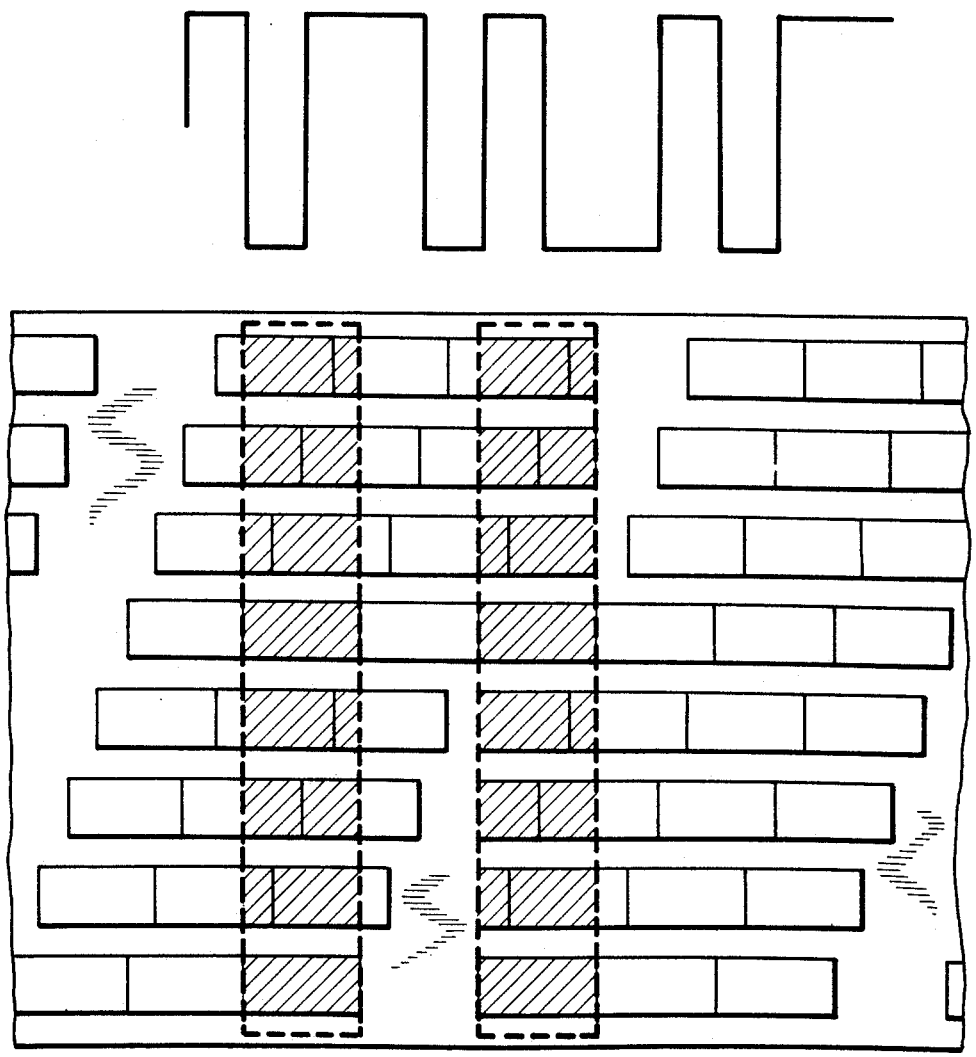
Figure 20:
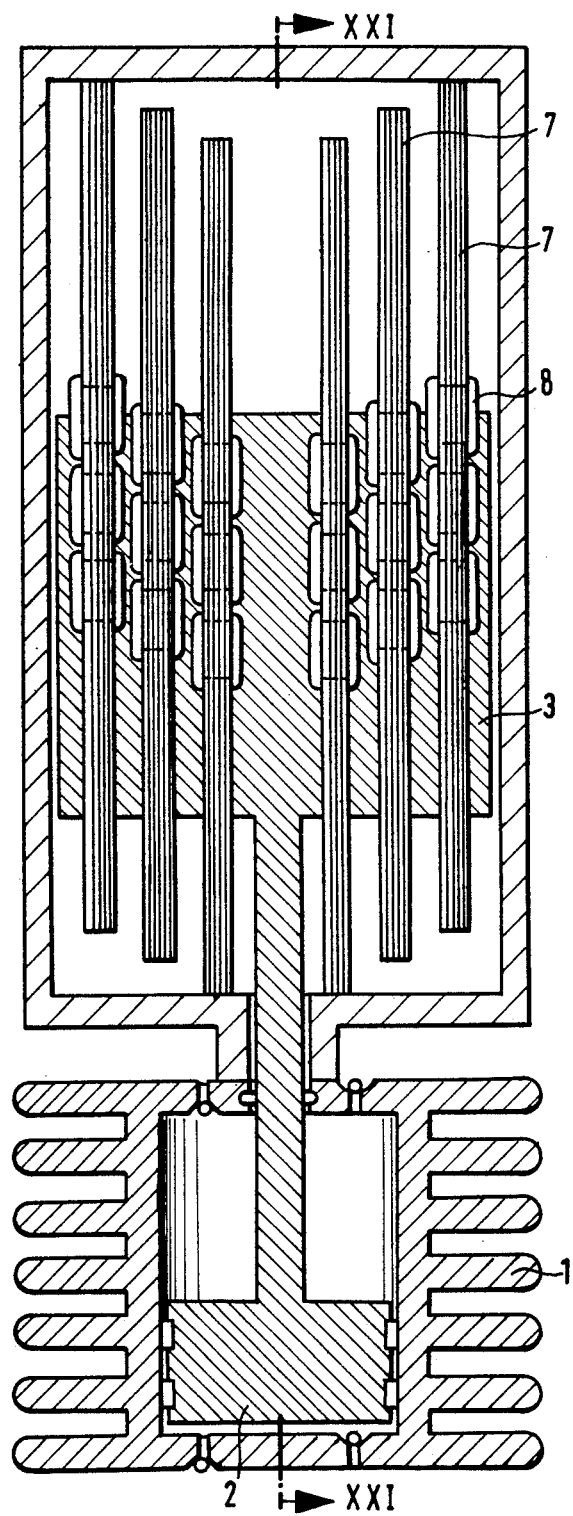
Figure 21:
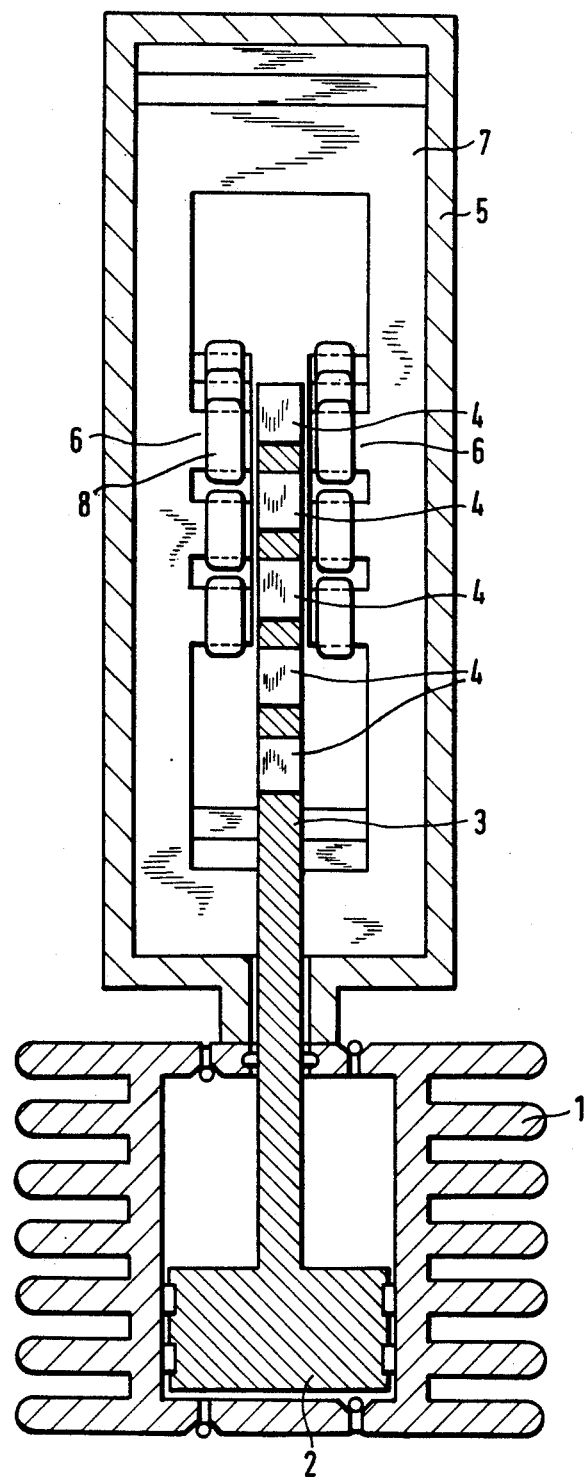
Figure 22:
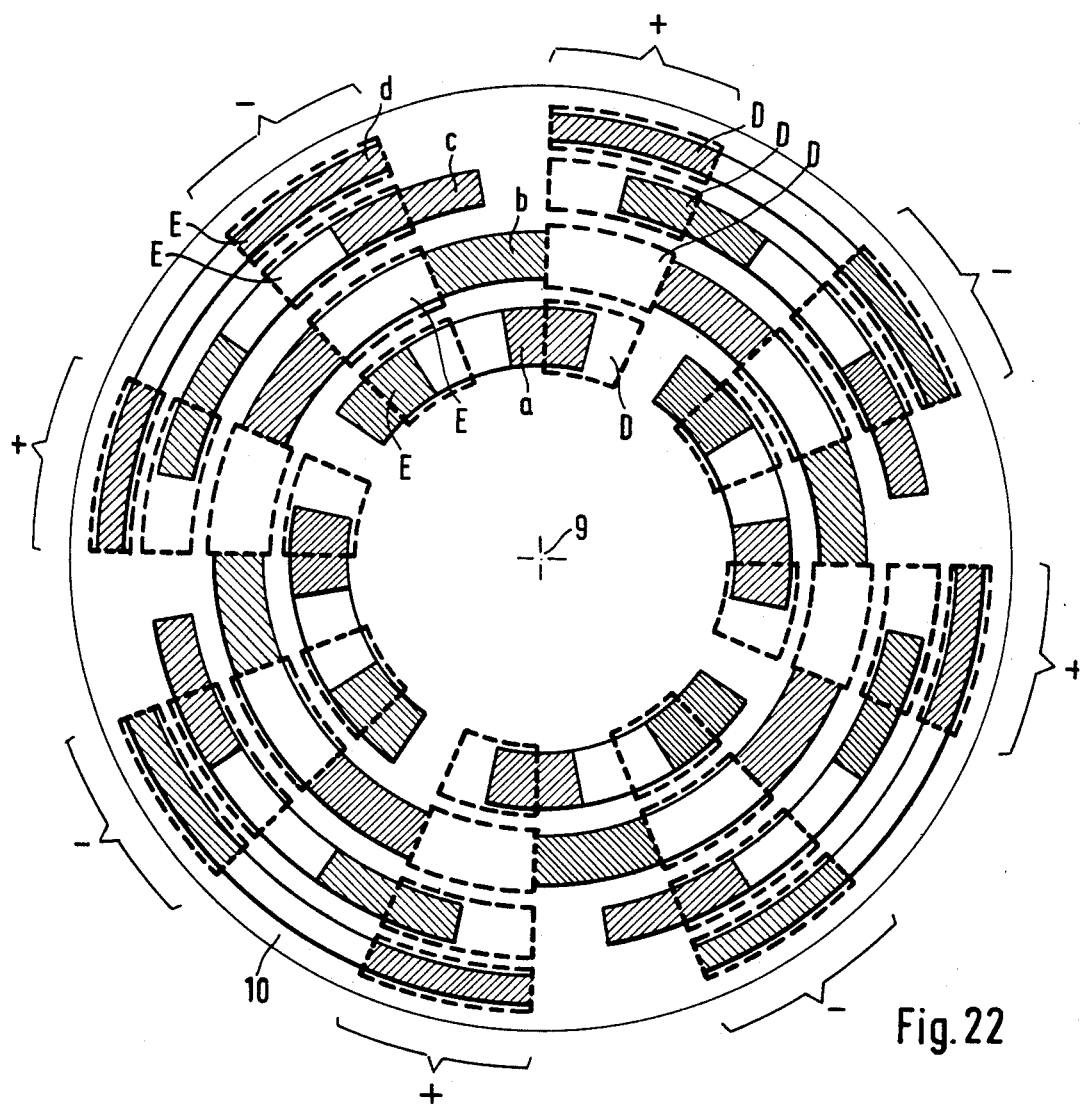
Figure 23:
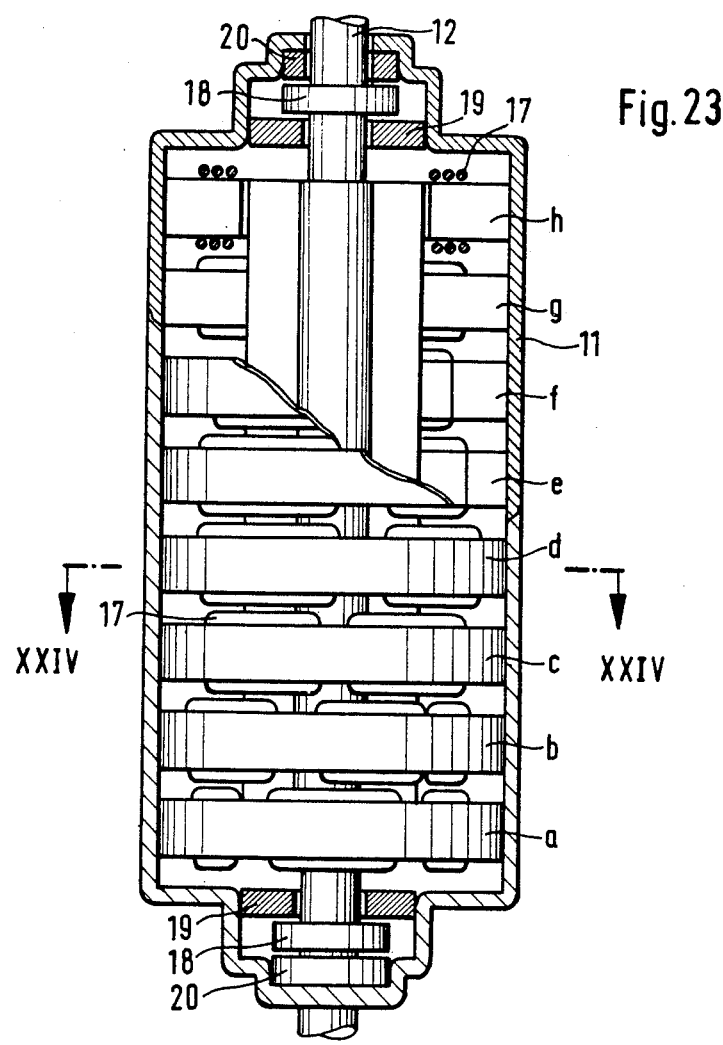
Figure 24:
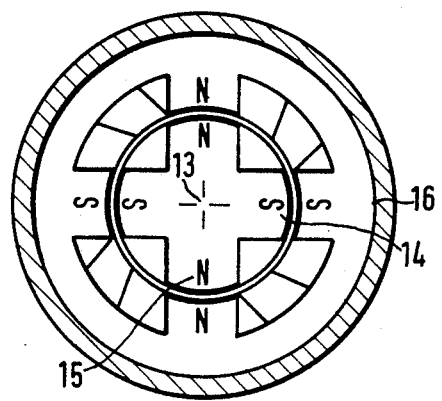
Figure 25:
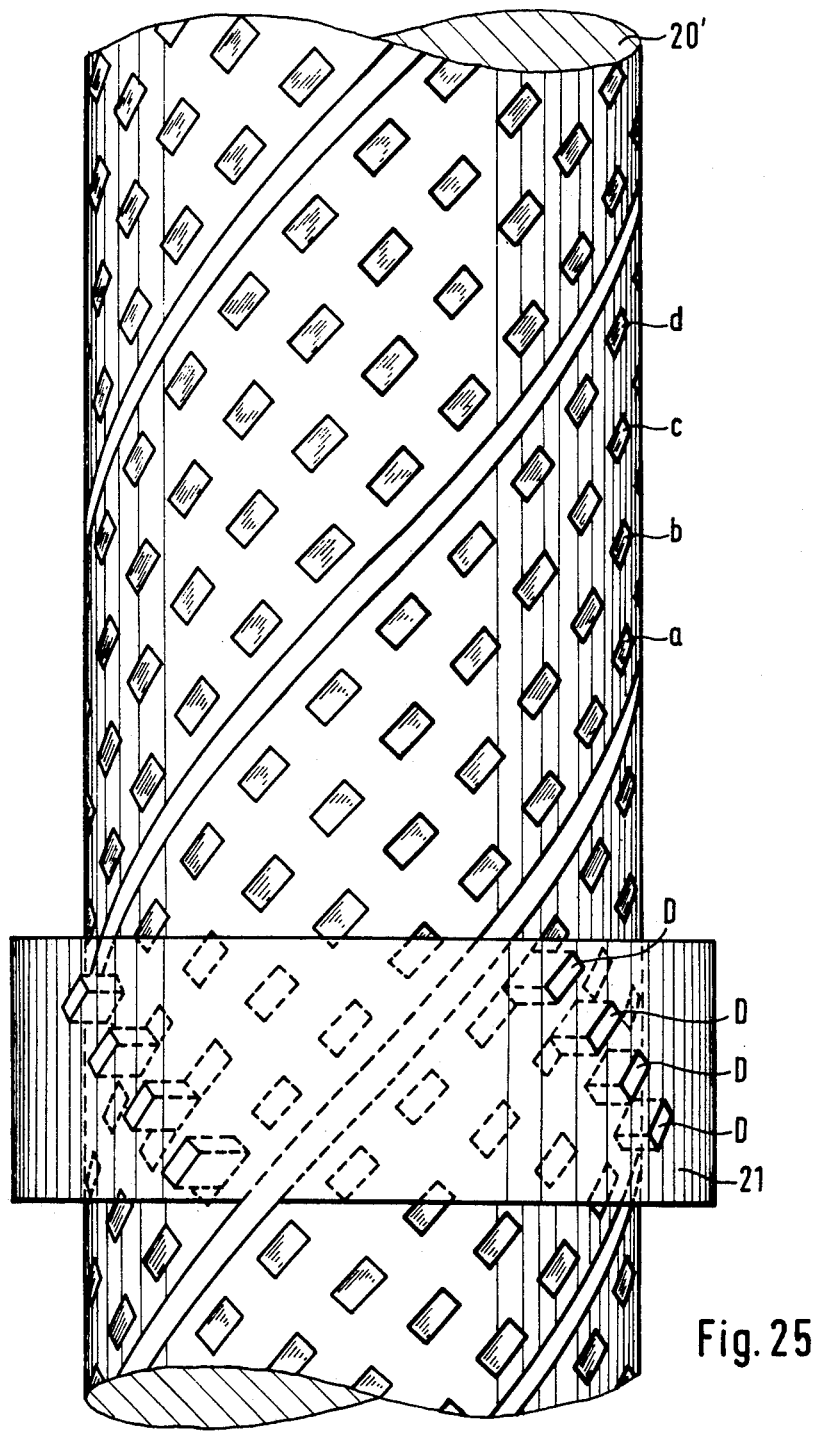
Figure 26:
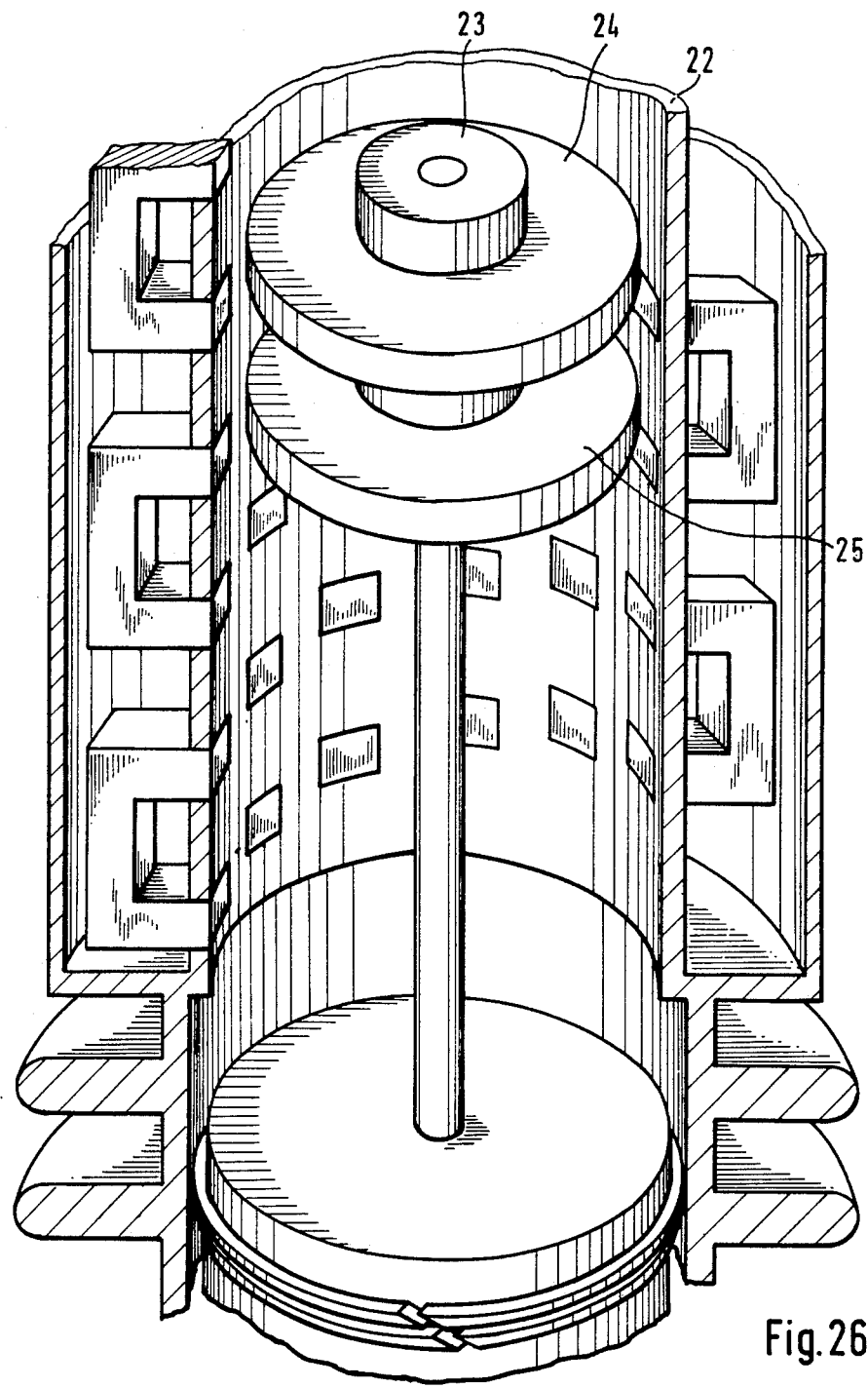
Figure 27:
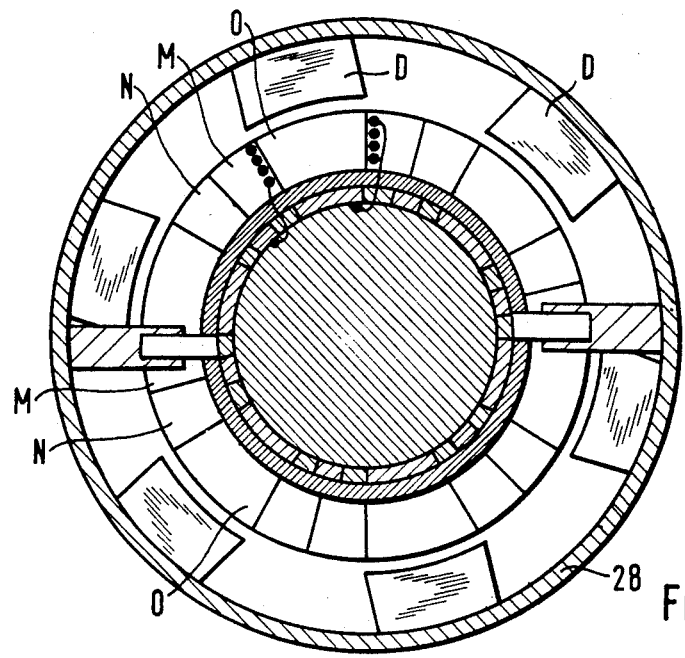
Figure 28:
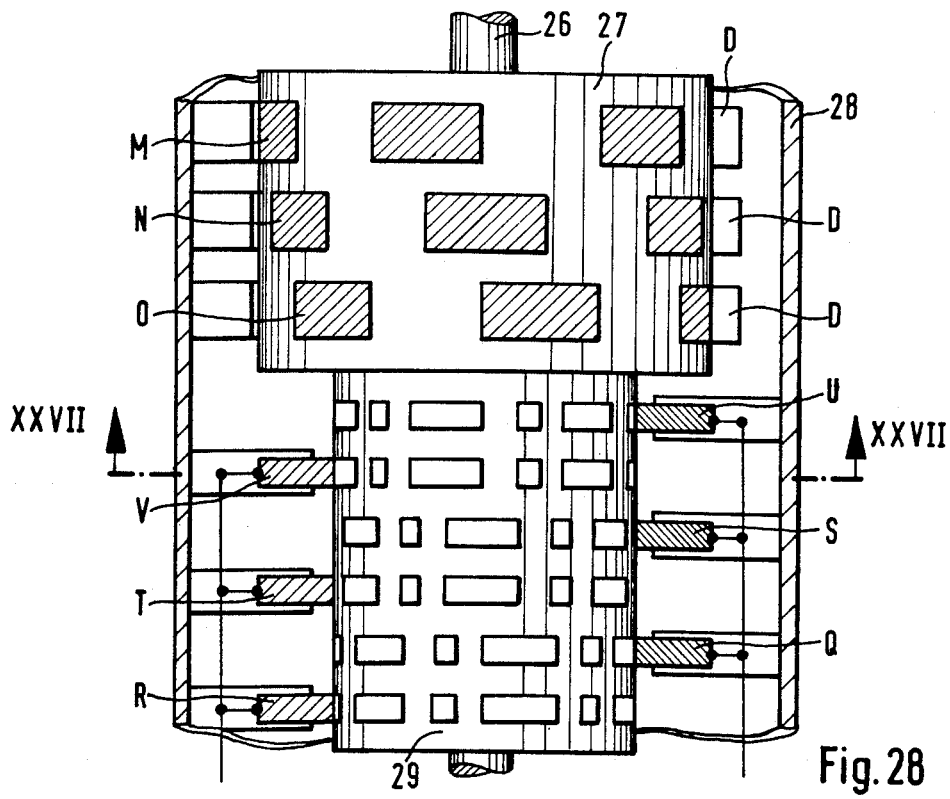
Figure 29:
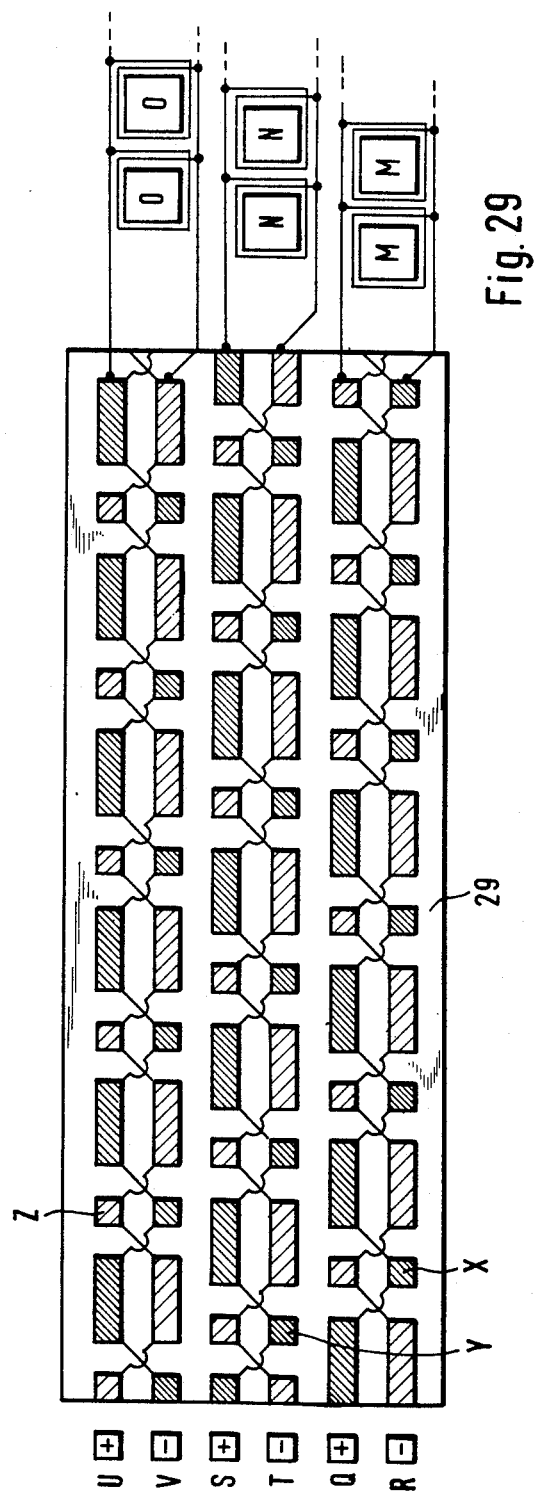

FIG. 15 is a fourteenth embodiment of a driving device in accordance with the invention having nine pole groups and adapted to produce linear movement, FIG. 16 is a fifteenth embodiment of a driving device in accordance with the invention having four pole groups with poles in each pole group which alternate in polarity and adapted to produce linear movement, FIG. 17 is a sixteenth embodiment of a driving device in accordance with the invention having six pole groups with poles in each pole group which alternate in polarity and adapt to produce linear movement, FIGS. 18a, 18b and 18c are a seventeenth embodiment of a driving device in accordance with the invention having six pole groups with poles in each pole group which alternate in polarity and adapted to produce linear movement, FIG. 19 is an eighteenth embodiment of a driving device in accordance with the invention having eight pole groups with poles in each pole group which alternate in polarity and adapted to produce linear movement, FIG. 20 is a lateral sectional elevation view of an embodiment of a driving device in accordance with the invention for driving a piston air compressor, FIG. 21 is a partial sectional elevation view of the driving device taken along line XXI—XXI of FIG. 20, FIG. 22 is another embodiment of a driving device in accordance with the invention having four pole groups and poles in each pole group which alternate in polarity and adapted to produce rotational movement, FIG. 23 is another embodiment of a driving device in accordance with the invention which is adapted to produce rotational movement, in a lateral elevation, partially in sectional view, FIG. 24 is a cross-section through line XXIV—XXIV of FIG. 23, FIG. 25 is yet another embodiment of a driving device in accordance with the invention by means of which a helical-like movement can be produced, FIG. 26 is yet another embodiment of a driving device in accordance with the invention adapted to produce reciprocating movement employed as a piston pump drive, FIG. 27 is a vertical elevation view of an embodiment for the polarity control of the electromagnetic poles of a driving device in accordance with the invention, FIG. 28 is a cross-sectional view of the device of FIG. 27 taken along line XXVIII—XXVIII; and FIG. 29 is a projected peripheral view of one segment of the embodiment of FIG. 27.

A first embodiment of a driving device in accordance with the invention is illustrated schematically in FIG. 1.

In this embodiment three pole groups a, b, c are disposed parallel to one another and to the desired direction of movement on a part which is designed as a stator. All poles have the same pole surface. The spacings between the poles are equal in every pole group which is designed as a rectilinear row of poles. Moreover, the pole spacings of the individual pole rows are equal to one another. In this embodiment the poles within each pole row all have the same polarity at the same time. The pole row b is not only directly adjacent pole row a, but also immediately follows the change of polarity of the pole row a in the polarity change sequence. Likewise, pole row c follows in its polarity change sequence the directly adjacent pole row b. The stator part supporting the pole rows a, b, c cooperates with a part which is relatively movable thereto in the direction of movement R. This part can be moved in the direction of movement R and supports a grouping of permanent magnetic poles D which are positive in the present example. This grouping extends across the entire width covering pole rows a, b, c of the first part and also extends perpendicular to the direction of movement. The poles of each pole row a, b, c of the first part are displaced by a displacement distance v relative to the poles of the pole group a or b which is the immediately preceeding pole group in the polarity change sequence respectively, starting from the pole grouping of pole D of the second part and measured parallel to the direction of relative movement R. Said displacement distance v corresponds to a whole fraction of the pole spacing of poles immediately following one another in the direction of relative movement within each pole group (pole pitch P). In the present example, the displacement distance amounts to one-third of the pole pitch. FIG. 1 illustrates six phases of relative movement of the movable part, containing the permanent magnetic poles D, relative to the poles of the pole rows a, b, c of the first stationary part of the device. The illustration readily indicates that the current input of each electromagnetic pole of the stationary part is regulated such that the polarity is changed to the same polarity as in a cooperating pole D of constant polarity of the movable part exactly at the time at which the pole D comes to lie opposite the pole to be changed in polarity after having moved toward it. In the embodiment in accordance with FIG. 1 in which all poles in each pole row of the stationary part have the same polarity, a change of polarity to a polarity opposite to that of the pole D cooperating therewith takes place at the instant at which the center of pole D, which has constant polarity and which is moved toward the electromagnetic pole to be changed in polarity, is located in front of the center of the pole to be changed at a distance which corresponds to the displacement distance v between the changeable poles. A diagram of the current flow in the poles of the individual pole rows a, b, c is also illustrated in FIG. 1. This reveals that the current flow of the respectively supplied current is asymmetrical with respect to the sign, i.e., longer current phases with one sign are followed by shorter current phases with the other sign. This clearly shows that the input current is not a conventional, symmetrical, single-phase or three-phase AC voltage. Current is applied to the poles of the pole rows a, b, c via a control device in response to the relative position of the movable part with the poles D with respect to the poles of the stationary part. Such a control device will be explained as an embodiment hereinafter. It is emphasized at this juncture, however, that a plurality of control possibilities which are known per se can be employed in which sensors, e.g. switches, electro-optical elements or induction coils, scan the respective position of the movable parts and conduct currents with signs corresponding to the position into the electromagnetic poles of rows a, b, c of the stationary part. The driving device in accordance with FIG. 1 is adapted to produce a rectilinear movement of the movable part with poles D in the direction of movement R. In so doing, this movement can occur either in one direction only, the number of poles in each pole row a, b, c being imagined as being arbitrarily continuous, or a reciprocating movement can be accomplished. In order to do this it is necessary to effect a current change the instant the movable part has reached a position covering the last or the penultimate pole of the stationary part in one direction of movement, such that the current input of the poles now progresses in the opposite direction so that the moved part is now moved back again over the poles of the pole rows a, b, c of the stationary part in the opposite direction.

Another embodiment of the device in accordance with the invention which is adapted to produce linear movement is illustrated in FIG. 2. Compared to the embodiment in FIG. 1 there is a difference in that three pole rows are again provided on the stationary part parallel to one another and extending in the direction of movement, but that the poles have an alternating pattern of opposite polarity in each pole row. Two adjacent poles of opposite polarity in each pole row are designed as the ends of a magnet dipole which may consist of a U-shaped core of magneticable material and a coil of electrical conductor wound thereabout, for example. The legs of the U-shaped core then form the actual poles. In this embodiment as well, a movable part can be moved in the desired direction of movement R relative to the stationary part, the movable part having a pole grouping of poles D of constant polarity, in this case positive polarity, — similar to the embodiment shown in FIG. 1 — the pole grouping extending across the width covered by the pole rows. Six successive phases of movement of the movable part relative to the stationary part are illustrated in FIG. 2. These phase illustrations reveal that the current input of each electromagnetic pole of the stationary part is regulated such that the polarity is changed to the same polarity as that of a cooperating pole of constant polarity of the other part respectively at the instant in which this pole reaches a position opposite the pole to be changed in polarity after movement towards it. In the embodiment according to FIG. 2, in which the electromagnetic poles in each pole group have an alternating pattern of opposite polarity, the current input is regulated so that the polarity is changed to a polarity opposite the polarity of the cooperating poles of constant polarity of the movable part at the instant at which the center of the pole of constant polarity which is moved toward the electromagnetic pole to be changed in polarity is located in front of the center of the pole to be changed at a distance which corresponds to the pole pitch of the poles of changeable polarity. In this embodiment as well, linear movement of the movable part relative to the stationary part can be produced both in an advancing direction, whereby the number of poles in each pole group of the stationary part can be extended arbitrarily, as well as in a reciprocating movement, whereby a change in the current input to the electromagnetic poles must occur analogous to the regulation desscribed in conjunction with the embodiment in accordance with FIG. 1 exactly at the time at which the movable part has reached the last or the penultimate pole of the stationary part in a covering position in its directions of movement. A diagram of the current flow in the poles of the individual pole groups in response to the position of the movable part is again illustrated in FIG. 2.

In FIG. 4 and the following figures, embodiments of the driving devices in accordance with the invention are illustrated which are designed such that the mutual forces of attraction and repulsion of the relatively movable parts are compensated in a direction extending perpendicular to the direction of movement so that a slight spacing constantly remains between the poles of the two parts which move past one another and these poles are prevented from coming into contact with one another without having to provide special guide bearing for the parts moving relative to one another to absorb the forces of attraction or repulsion. In order to achieve such a "self-supporting" or "self-guiding" configuration, it is necessary that the electromagnetic poles in each pole group be disposed so as to be displaced with respect to one another in a specific manner. In order to be able to explain this arrangement, it is first of all necessary to define a concept which is used below in this connection, the concept of "the overlap". The geometrical relationships which must be taken into consideration are illustrated in FIG. 3 with special application to electromagnetic poles with a rectangular surface and a pole grouping of the movable part extending in a direction of inclination perpendicular to the direction of movement. In principle, however, it is possible to arrange the pole grouping of the movable part in a direction of inclination extending in an acute angle to the direction of movement of the movable part. It is not absolutely necessary either that the poles have rectangular surfaces. The illustration in FIG. 3, however, is easily understandable, even if it only applies to one special case, and it shall therefore be taken into consideration now to explain the definition of the concept of "overlap". In the following, the term "overlap" shall be understood to mean the ratio of one of those surface areas $F_1$ of adjacent poles $P_a$ and $P_b$ of pole groups $a$ and $b$ which succeed one another in the polarity change sequence and which are overlapped by an imaginary area strip F defined by lines $L_1$ and $L_2$ parallel to the direction of inclination W of the pole grouping of the second part, the one line $L_1$ being a tangent to the end of the initially passed pole $P_a$ as seen in the direction of movement R and the other line $L_2$ being a tangent to the beginning of the pole $P_b$ passed thereafter seen in the direction of movement R, with respect to the total surface of a pole $P_a$ or $P_b$.

In order to attain a construction of a driving device in accordance with the invention which is a "self-supporting" or "self-guiding" device, the aforedefined overlap must amount to at least ¼ and correspond at its maximum to an amount which is given by the quotient of the number $z$ of the displacement distances $v$ with respect to the bridging of a pole pitch P, also termed the pole subdivision number Z, minus 1 and the pole subdivision number. The condition for the overlap Ue to achieve a self-supporting driving device can be illustrated in a formula as follows:

$$\tfrac{1}{4} \leq Ue \leq \frac{Z-1}{Z}, \text{ where } Z = P/V.$$

One embodiment for a driving device in accordance with the invention for producing linear movement is illustrated schematcially in FIG. 4. The overlap in this embodiment is Ue = ¼. Three parallel pole rows of electromagnetic poles are provided on a stationary part. A second part indicated by the dotted lines can be moved relative to these pole rows. FIG. 4 shows four successive phases of movement of the movable part. The movable part has permanently magnetic poles of constant polarity (not shown in detail) each of which is positioned in the area of one pole row which is passed. In the present example, these poles of the movable part are positive poles. In this embodiment the electromagnetic poles of the stationary part are controlled such that the polarity is changed to the same polarity as in the case of a cooperating pole of constant polarity of the movable part at the very moment at which this pole comes to lie opposite the pole to be changed after moving towards it. The control is thus analogous to the control in the embodiments in accordance with FIGS. 1 and 2. In the self-supporting embodiment according to FIG. 4, however, the polarity of the approached pole to be changed is changed to a polarity opposite the polarity of the cooperating pole of constant polarity at the moment the approached pole of constant polarity has overlapped the pole to be changed by an amount equal to the overlap Ue.

One embodiment of a driving device for producing linear movement is illustrated schematically in FIG. 5 and comprises four parallel pole groups of electromagnetic poles on a stationary part and a part which can be moved relative thereto having a pole grouping (not shown) of constant (positive) polarity extending transversely to the width of the pole groups. FIG. 5b shows a design in which the pole groups which succeed one another in the change sequence are also positioned directly adjacent one another. By contrast, FIG. 5c shows a design in which pole groups which succeed one another in the change sequence are positioned alternately on both sides of a line extending parallel to the imaginary direction of movement. In the case of both designs illustrated in FIGS. 5b and 5c, the overlap of the poles succeeding in the change sequence amounts to ¼. The current flow in the individual pole groups is shown schematically in FIG. 5a in response to the position of the movable part.

The embodiments illustrated in FIG. 6 are extensively similar to the embodiments shown in FIG. 5, but the overlap in the embodiments in accordance with FIG. 6 amounts to ⅓.

FIG. 7 is one embodiment of the driving device for producing linear movement in which three parallel pole groups $a, b, c$ are provided on the stationary part. A second part is movable relative to said stationary part and has poles (not shown) in a grouping transversely to the width covered by the pole groups of the stationary part. Four phases of movement of the movable part relative to the stationary part are illustrated in FIG. 7 and the current input of the individual pole groups in response to the position of the movable part is shown as well. In this embodiment, the pole groups succeeding one another in the change sequence are not necessarily immediately adjacent one another, but are positioned in exchanged positions so that pole group $c$ comes to lie between pole groups $a$ and $b$. The overlap between the poles in the pole groups succeeding one another in the change sequence amounts to ⅓ in this embodiment.

Two further developments of an embodiment with six parallel pole rows respectively located on the stationary part are illustrated in FIG. 8. In the embodiment according to FIG. 8b, pole rows directly adjacent one another in the change sequence are also positioned to be directly adjacent one another. In the embodiment according to FIG. 8c, pole rows which succeed each other directly in the change sequence are positioned alternately on both sides of an imaginary line extending parallel to the desired direction of movement. Such an arrangement produces an especially favorable compensation of attracting and repelling forces between the poles of the stationary and the movable part to achieve a self-supporting device without any additional guide bearings. The development in accordance with FIG. 8c may be considered as a device which comprises two devices with three pole groups each arranged side by side, these two devices having three pole groups each, however, being offset or displaced in the direction of movement by a distance corresponding to the overlap of the poles of the entire device which succeed each other in the change sequence. The overlap amounts to $\frac{1}{2}$ both in the development according to FIG. 8b as well as in the development according to FIG. 8c. The current flow in the individual pole groups in response to the position of the movable part is shown in FIG. 8a. In the case of the developments according to FIGS. 8b and 8c, it must be emphasized that the movable part consists of a pole grouping in this case which in turn respectively consists of a pole group of two poles of constant polarity succeeding one another at a distance of one-half the pole pitch and positioned above each pole group of the stationary part respectively. In the case of the movable part, the poles of constant polarity are combined to form two pole rows of constant polarity extending transversely to the entire width of the device in order to achieve a construction with a simple structure.

An embodiment of a driving device for producing linear movement is illustrated in FIG. 9 which has six parallel pole rows on the stationary part just like the embodiments in accordance with FIG. 8. The embodiment according to FIG. 9 can be regarded as a device combined of two devices each having three pole groups positioned in mirror image on a line extending parallel to the direction of movement. The movable part consists in this case of a magnetic bar of constant polarity extending across the entire width of the device. In this mirror-symmetrical arrangement, an exact balance between the forces of repulsion and attraction of the relatively movable magnetic poles is achieved in a direction perpendicular to the direction of movement. Thus the necessity of providing guide bearings to absorb magnetic forces perpendicular to the direction of movement to maintain a gap between the magnets of the parts moved relative to one another is eliminated completely.

Two further designs of driving devices adapted to produce linear movement and comprising six parallel pole rows respectively are shown in FIG. 10. The arrangement of the pole rows in FIGS. 10b and 10c is analogous to the arrangement of the pole rows in the case of the further developments in accordance with FIGS. 8b and 8c, but the devices according to FIG. 10 have an overlap of $\frac{3}{4}$. The movable part in the designs according to FIG. 10 supports a pole grouping of poles of constant polarity, each of which is positioned above one respective pole row of the stationary part. The current flow in the individual pole rows in response to the position of the movable part is again illustrated in FIG. 10a.

FIG. 11 shows an embodiment of the driving device where nine parallel pole rows are provided having poles of the same polarity within a respective row. The overlap in this embodiment amounts to $\frac{1}{3}$. A movable part can be employed in this embodiment which has a pole grouping of poles of constant polarity, each pole row of poles of changeable polarity of the stationary part capable of being associated respectively with a pole group of three or even more poles of constant polarity which are spaced at a distance three times the displacement of the poles of adjacent pole rows. In the present embodiment, the poles of the pole groups are respectively combined to form magnetic bars of constant polarity extending over the entire width of the device in order to simplify the construction. The embodiment according to FIG. 11 can also be considered as a device comprising three devices each consisting of three pole rows, each of said three devices being displaced relative to the adjacent one by a displacement corresponding to the displacement of the poles of mutually adjacent pole rows.

FIGS. 12 and 13 show two embodiments of devices for producing linear movements each comprising nine parallel pole rows, in which the poles in each row have the same polarity. The arrangement of the pole row in the embodiment in accordance with FIG. 12 corresponds substantially to the arrangement of the pole rows in the embodiments in accordance with FIGS. 10b and 8b, whereas the arrangement of the pole rows in the embodiment in accordance with FIG. 13 corresponds substantially to the arrangement of the pole rows in the embodiments in accordance with FIGS. 10c and 8c. The overlap in the case of the embodiments according to FIGS. 12 and 13 amounts to $\frac{2}{3}$.

Two further embodiments of devices respectively containing nine pole rows are illustrated in FIGS. 14 and 15 and have a pole row arrangement corresponding substantially to the pole row arrangement in the examples according to FIG. 12 or 13. The overlap in the embodiments according to FIGS. 14 and 15 amounts to 5/6 respectively.

The embodiments hitherto described in accordance with FIGS. 4 to 15 include a polarity control of the electromagnetic poles which was described with reference to the embodment in accordance with FIG. 4.

Embodiments of the driving device will be described in the following with reference to FIGS. 16 to 19, each of which has a stationary part having a plurality of parallel pole rows, the poles in each pole row having alternating polarity at each instant. Two succeeding poles of opposite polarity in each pole row respectively can be designed as the poles of a magnetic dipole, for example a magnetic dipole formed of a U-shaped core of magnetizable material wound with a coil of electrical conductor.

An embodiment of a driving device comprising four parallel pole rows of electromagnetic poles in the stationary part is shown in FIG. 16. In this embodiment the pole rows succeeding each other in the change sequence are not directly adjacent one another, but are positioned alternately on both sides of an imaginary line extending in the line of movement. The overlap of the poles of pole rows which succeed each other in the change sequence amounts to $\frac{1}{2}$ in this embodiment. A part is provided as the movable part in this embodiment which supports a permanent magnetstrip of positive polarity extending transversely to the width of the device and a permanent magnet strip of negative polarity spaced at a distance corresponding to the distance between poles in the pole rows of the stationary part. The movable part thus has a pole grouping which extends over the width of the device and which has a pole group consisting of a positive and a negative permanent magnetic pole in the path area of each pole row of the stationary part. In this embodiment, the current input of each electromagnetic pole of the stationary part is regulated such that the polarity is changed to the same polarity as a cooperating pole of constant polarity of the movable part at the very moment at which this pole comes to lie opposite the pole to be changed after having moved toward it. As far as it is concerned, the control concurs with the controls of the embodiments hitherto described. Due to the structure of the embodiment according to FIG. 16 having pole rows with poles of alternating polarity in the stationary part, during a relative movement of the movable part as compared to the stationary part, the polarity of a pole which is to be changed and which is approached by a pole of constant polarity is initially opposite the polarity of the approaching pole of constant polarity. Therefore, in the embodiment according to FIG. 16, the electromagnetic poles of the stationary part are thus controlled such that the polarity is further changed to the same polarity as in a cooperating pole of constant polarity of the other part at the very moment the front edge of this pole of constant polarity coincides with the edge of the pole to be changed lying closest to it in the direction of movement after a movement executed toward said pole to be changed. Moreover, a change in polarity of the approached pole to be changed to a polarity opposite the polarity of the cooperating pole of constant polarity occurs at the moment when the approaching pole of constant polarity covers the pole to be changed by an amount equal to the overlap. The polarization of the individual poles is shown in FIG. 16 in eight phases of movement of the movable part relative to the stationary part. The current flow in the individual poles in the eight illustrated phases of movement is also shown schematically.

FIG. 17 illustrates an embodiment whose basic structure corresponds extensively to the embodiment according to FIG. 16, but where six pole rows with electromagnetic poles alternating in each row are provided in the stationary part. The overlap in the embodiment in accordance with FIG. 17 amounts to ½.

Two further developments of driving devices having pole rows with alternating polarity in successive poles are shown in FIG. 18. The overlap in both developments amounts to ½. In the embodiment according to FIG. 18b the pole rows which succeed one another in the change sequence are positioned alternately on both sides of an imaginary line extending in the direction of movement just like in the embodiments in accordance with FIGS. 16 and 17. The structure of the movable part in the embodments according to FIGS. 18b and 18c corresponds substantially to the structure of the movable part in the embodiment according to FIG. 16.

The structure of the embodiment according to FIG. 19 corresponds substantially to the embodiment according to FIG. 18b, but has eight parallel pole rows with poles of alternating polarity in the stationary part. The overlap here amounts to ¼.

Embodiments of driving devices were shown with reference to FIGS. 4 to 19 in which the forces of attraction and repulsion of the poles of the relatively movable parts are balanced substantially or completely so that even bearings for mutually guiding the parts can be omitted either substantially or completely. The driving devices which are self-supporting or self-guiding in this manner can be used in many fields of applications, for example in applications where reciprocating movements are necessary. An embodiment of a driving device in accordance with the invention, constructed to be self-supporting and to drive an air compressor, is illustrated in FIGS. 20 and 21. As the figures reveal, the piston air compressor driven by the driving device has only one cylinder 1 and a piston 2 reciprocatable therein. The crankcase, crankshaft, piston rods and flywheel as well as the bearings and pins, parts required in conventional compressors, can be omitted completely when a driving device in accordance with the invention is employed for reciprocal movement of the piston 2. Although a simple structure of air compressors is possible also in the case of vibrating membrane air pumps, these suffer from the drawback that the piston stroke is too short. By contrast, there are no limits to the piston stroke when a driving device in accordance with the invention is employed. The piston 2 is connected with a movable part 3 of the driving device via a connecting rod. Permanent magnets 4 extending transversely to the direction of movement are arranged on the support in a grouping (not shown in detail) which can correspond, for example, to the grouping illustrated in FIG. 9 transversely to the path of movement, a plurality of transversely extending groups being provided in the direction of movement. A stationary part 5 is positioned on both sides of the movable part 3 and includes six pole rows extending parallel to the direction of movement on each side of the support 3. Pole rows of poles lying oppositely on both sides of the part 3 can respectively have opposite polarity and can be changed simultaneously. The permanent magnets 4 in part 3 accordingly have areas of opposite polarity on both sides of part 3 facing the respective electromagnetic poles of part 5. The magnetic poles 6 of part 5 are designed as cores formed of magnetizable sheets 7 with coils 8 of electrical conductors wound thereabout. The current input of the electromagnetic poles 6 can be effected in the manner described with reference to the device in accordance with FIG. 9. The compressor assembly illustrated in FIGS. 20 and 21, driven by a driving device in accordance with the invention, can be designed as a unit which is completely closed and sealed within itself for example and which can be employed in refrigeration systems.

An embodiment of the driving device in accordance with the invention is illustrated schematically in FIG. 22 which can serve to produce a rotational movement. In the case of this embodiment, the pole groups a, b, c, d of the first part are located in concentrical circles on a support 10 designed as a circular disc whose center is located in the imaginary axis of rotation 9 and extends perpendicular to the same. The second part of the driving device, which can be moved relative to the first part 10, also has a support designed as a circular disc, which is not shown in FIG. 22 for the sake of simplicity, which is rotatable about the axis of rotation 9 relative to the support 10 of the first part and which supports poles D and E of constant polarity with a positive or negative sign in groupings extending from the center outwardly. The circumferential length of the poles increases from the center outwardly proportional to the radius corresponding to the radial position of the respective pole row. In the illustrated embodiments, successive poles in each pole row a, b, c, d have opposite polarity and can be changed in their polarity in accordance with a control. The structure and control correspond in principle to the embodiment in accordance with FIG. 5b, it being assumed that the direction of rotation of the movable part in the embodiment according to FIG. 22 is counter-clockwise. The design according to FIG. 22 results in a substantially disc-shaped driving device for producing rotational torque about the axis 9 which is very short measured in the direction of the axis of rotation 9. The two discs of this motor, which can be rotated relative to one another, are subject to a force which acts between areas of the discs facing one another so as to push them apart and which is caused by the magnetic forces of the relative movable poles. This effect can be utilized to produce a variable rotational torque by varying selectively the air gap between the relatively movable discs. If two of the driving devices according to FIG. 22 operate on a common axis, i.e., are disposed for example such that the movable discs of the two driving devices are secured to opposite ends of a common axis of rotation, the result is a driving device in which all axial forces between the relatively movable parts are compensated and which thus gets along without any special bearings for absorbing axial forces. The result is thus a self-supporting, bearing-free motor in which all magnetic areas operate as a motor and in which every possibility of producing turbulence which slows down the motor is eliminated. Such a drive means can be employed in particular in those cases where high precision is required in the movement of heavy loads.

Another embodiment of a driving device for the production of rotational movement is illustrated in FIGS. 23 and 24. In this embodiment, the pole groups a – h of a stationary part are disposed along inner circumferential circles lying proximately in axial direction on the inner surface of a hollow circular-cylindrical support 11 whose axis coincides with the axis of rotation 12. A second part of the device is designed as a coaxial cylinder 13 disposed in the hollow cylindrical support 11 and having poles 14 and 15 of constant polarity correspondingly located on the outer circumference thereof. Cylinder 13 is supported to rotate relative to the first part 11 about its axis located in the axis of rotation 12. In the illustrated embodiment, eight pole rows with electromagnetic changeable poles are provided in the stationary part, poles succeeding each other in each pole row having opposite polarity. The poles consist of cores of magnetizable material 16, e.g. of magnetizable sheet, and coils 17 of electrical conductor wound thereabout. The structure of the driving device according to FIG. 23 corresponds in principle to the structure of the embodiment according to FIG. 19. The poles of the inner part which is designed as a cylinder 13 are constructed as permanent magnetic poles. At both ends of the device, permanent magnetic rings 18 are provided on the axis of rotation 12, said permanent magnetic rings 19 of opposite and axial to permanent magnetic rings 19 of opposite polarity which are secured to the stationary part 11 so that axial movements of the part 13 which is designed as a rotor are prevented. Furthermore, support rings 20 are disposed in the housing which serve to support the rotor 13 when the current is de-energized. As soon as the current is supplied, the rotor 13 automatically leaves the support rings due to the action of the magnetic forces and then operates without any mechanical bearings, supported by the magnetic forces, practically without friction. The electrical control of the device according to FIG. 23 can be effected in the manner described with reference to the embodiment in accordance with FIG. 19.

An embodiment of a driving device is illustrated in FIG. 25 by means of which helical movement can be produced consisting of a rectilinear and a rotational component of movement. In this embodiment, electromagnetic pole groups a, b, c, d each of whose polarity is changeable are disposed on the outer circumference of a circular-cylindrical support 20' along helical lines extending in the desired direction of movement about the cylinder axis. A second part which is movable relative to the circular-cylindrical support 20' is designed as a support 21 which concentrically encompasses the circular-cylindrical support 20', which is constructed as a hollow cylinder, which supports poles D of constant polarity which are positioned on its inner circumference corresponding to the arrangement of the pole groups a to d of the stationary cylinder 20' and which is both axially as well as rotationally movable relative to the stationary part 20'. Due to the arrangement of the pole groups a to d on the stationary part 20' and the cooperating poles of constant polarity on the movable part 21, helical movement of the part 21 can be produced. The principle structure of the driving device according to FIG. 25 corresponds to the structure of a driving device illustrated in FIG. 5b.

FIG. 26 shows an embodiment of the driving device for the production of linear reciprocal movement and this embodiment can serve to drive the piston of an air compressor, for example. The stationary part is designed as a hollow cylindrical support 22 on whose inner surface pole groups are disposed along generatrices. In the present example, poles succeeding each other in each pole group have opposite polarity. A second part which is adapted to reciprocate in an axial direction relative to the stationary part 22 is designed as a coaxial part 23 disposed in the hollow cylindrical support which supports two magnetic discs of opposite, constant polarity 24 and 25 in an axial spaced relation corresponding to the pole pitch. The electrical conductor coils which cause the magnetization and encompass the U-shaped cores of magnetizable material have been omitted in the case of the electromagnetic poles of the stationary support 22 for the sake of simplicity. The principle structure and control of the device according to FIG. 26 corresponds to the embodiment shown in FIG. 18b.

In all of the above-discussed embodiments of the driving device in accordance with the invention, the control of the current input and polarization of the electromagnetic poles can be effected in response to the relative position of the movable part with respect to the stationary part of the device by means of a plurality of means known per se for detecting the relative position and correspondingly supply the current. Electrooptical means such as photoelements, induction coils, contact switches, Hall effect sensors, for example, were already mentioned as sensors for detecting the relative position of the mutually movable parts of the device. An embodiment of a device for controlling the current input of the electromagnetic poles in the case of a driving device in accordance with the invention will now be described in the following with reference to FIGS. 27 to 29 in which sliding contacts are employed for control purposes. FIG. 28 represents a cross-section through the device corresponding to the line XXVIII—XXVIII in FIG. 27. In the embodiment, the driving device consists of a rotor 27 which can be rotated about an axis of rotation 26 and which has pole rows with poles M or N or O on its outer circumference in concentrical, axially spaced circles, all poles in each pole row having the same polarity at every instant. The stator is designed in this embodiment as a hollow cylinder 28 which has pole groupings of permanent magnets D extending on its inner surface in the direction of the generatrix. The principle structure of the driving device thus corresponds to the structure of the embodiment in accordance with FIG. 4, wherein a part, which is not the part supporting the permanent magnet poles being movable relative to the part supporting the electromagnetic poles, but rather the rotor 27 supporting the electromagnetic poles is movable relative to the stator 28 supporting the permanent magnets. A circular cylinder 29 is secured coaxially to one end of the rotor 27 and includes contact areas on its outer circumference which are interconnected electrically in a definite way. The electrical connection of the contact areas is illustrated in FIG. 29 in a developed projection of the outer periphery of the cylinder 29. On the inner circumference of the stator 28 are located contacts Q, R, S, T, U and V. The contact brushes Q and R conduct current into pole row M. Contact brushes S and T conduct current into pole row N. Contact brushes U and V conduct current into pole row O. In FIG. 29, the current sequence and the current direction sequence are illustrated which are obtained in this manner in the cylinder 29 and are supplied to the poles. Every time a pole M passes over a permanent magnet D, the contacts Q and R begin to make contact with collector contacts X. Every time a pole N passes over a permanent manget pole D, brushes S and T begin to make contact with a collector contact Y. Every time a pole O passes over a permanent magnet pole D, brushes U and V begin to make contact with a collector contact Z. The duration of a polarity input and the polarity change are illustrated schematically in FIG. 29 together with the offset arrangement of the affected poles M, N and O.

A control device of the structure illustrated in FIG. 27 to 29 can be designed and employed mutatis mutandis for the control of all other embodiments as was discussed hereinbefore.

The polarity control can be designed as well, for example, so that only a single sensor is employed to detect the relative position of the movable part with respect to the stationary part. A suitable electronic circuit is triggered by means of a feedback circuit to control the current input to all pole groups of electromagnetic poles in this way.

With regard to self-centering rotary motors, embodiments have been discussed in connection with FIGS. 23, 24 and 25. When a self-centering motor encounters large bearing forces, it is possible according to the invention to diminish considerably that part of the centering force which adds to the bearing force, so that the centering force opposing the bearing force is practically free to work exclusively against the bearing force. To do this, at least three sensors (Hall effect sensors, strain gage sensors, etc.) are located along the periphery of the stator. These sensors signal the location of any air gap diminution. This data is electronically processed, so that the amplitude of the current pulses sent to the coils facing the larger air gap is diminished, whereby that part of the centering force which adds to the bearing force is also accordingly diminished.

The invention is not restricted to the recited examples. It is also possible, for example, to design electromagnetic poles at the pole groups as zigzag-shaped sequences of electromagnetic poles and to interlace the zigzag sequences with one another. It is also possible to provide both the stationary part of the drive as well as the part movable relatively thereto with electromagnetic poles which are individually controlled.

The driving device in accordance with the invention can also be employed as a current generator for producing currents with an asymmetrical phase relationship. These currents may be supplied to a network, for example, which can feed a plurality of independent, synchronous, self-supporting driving devices. In this way the electrical means can be avoided which would be necessary to feed self-supporting drive means of the aforedescribed type with current of a normal symmetrical phase relationship. The use of the aforecited devices as generators also makes it possible to utilize other drive movements instead of rotary movements directly for the production of current which up to now could not be used in normal generators to produce energy without the hitherto necessary mechanical conversion into a rotary movement. Reciprocal movements, spiral movements and up-and-down movements (e.g. of waves) for example can be used directly to produce electrical energy.

What is claimed is:

1. An electromagnetic driving device comprising two parts which are movable relative to one another, each part supporting a plurality of magnetic poles which act together with the magnetic poles of the other respective part to produce a force causing a relative movement of the parts, the poles of at least one part being designed as electromagnetic poles whose magnetic polarization is controlled, the poles of at least one part being arranged in at least three groups extending in a direction of relative movement and the pole spacings within each group, measured in the direction of relative movement, being constant and of equal magnitude in all groups, and the poles of the other respective part which cooperate with the poles disposed in groups being arranged in at least one grouping which extends at an angle to the direction of relative movement and which traverses the entire width covered by the pole groups of said first part, the poles of each group of said first part being displaced relative to the poles of the group immediately preceding it in the polarity change sequence by a displacement distance proceeding from the direction of inclination of the pole grouping of the second part, measured parallel to the direction of relative movement and corresponding to a whole fraction of the pole distance of poles within each group which succeed one another in the direction of relative movement (pole pitch), but corresponding to at least the quotient of the pole pitch and the total number of groups, said electromagnetic poles of the one part being simultaneously changeable in polarity, the current input of each electromagnetic pole of said one part being controlled such that a polarity change to the same polarity as in a cooperating pole of constant polarity of the other part takes place at the very instant at which this cooperating pole comes to a position opposite the pole to be changed after having moved toward it, a polarity change to a polarity opposite the polarity of the cooperating poles of constant polarity of the other part taking place, dependent of whether the succeeding poles of each pole group all have the same or alternately opposite polarity at each moment, at the very instant at which the pole of constant polarity which moves towards the electromagnetic pole to be changed is positioned at a distance from the pole to be changed which permits a magnetic force of attraction to be effective.

2. The driving device according to claim 1, wherein the electromagnetic poles of the one part in each pole group all have the same polarity at every moment and cooperate with another part, in which the poles of constant polarity within each pole group have the same polarity, and the electromagnetic poles of the one part are controlled such that a change of polarity to a polarity opposite to that of the cooperating poles of constant polarity of the other part respectively occurs at a time at which the center of the pole of constant polarity which is moved toward the electromagnetic pole to be changed is located at a distance from the center of the pole to be changed which corresponds to the displacement distance (v) between the changeable poles of groups immediately succeeding one another in the change sequence.

3. The driving device according to claim 1, wherein the electromagnetic poles of the one part in each pole group all have the same polarity at every moment and cooperate with another part in which the poles of constant polarity within each pole group alternately have opposite polarity, and the electromagnetic poles of the one part are controlled such that the polarity is changed to a polarity opposite the polarity of the cooperating poles of constant polarity of the other part at the very instant at which the pole of constant polarity which is moved toward the pole to be changed is located at a distance in front of the pole to be changed which corresponds to the pole pitch of the poles of constant polarity.

4. The driving device according to claim 1, wherein the electromagnetic poles of the one part in each group extending in the direction of movement alternately have the opposite polarity and are controlled such that the polarity is changed to a polarity opposite the polarity of the cooperating poles of constant polarity of the other part at the very instant at which the center of the pole of constant polarity which is moved toward the electromagnetic pole to be changed is located at a distance in front of the center of the pole to be changed which corresponds to the pole pitch of the poles of changeable polarity.

5. The driving device according to claim 1, wherein each pole group of each part which extends in the direction of relative movement is designed as a pole row extending parallel to the direction of relative movement and the individual pole rows are arranged next to one another.

6. The driving device according to claim 1, wherein directly adjacent poles of pole groups succeeding one another immediately in th change sequence are displaced by a displacement distance resulting in an overlap, defined as the ratio of one of those surface areas ($F_1$) of adjacent poles of pole groups ($a,b$) which succeed each other in the change sequence and which are overlapped by an imaginary area strip (F) which defines lines ($L_1$, $L_2$) parallel to the direction of inclination (w) of the pole grouping (D,D) of the second part, line ($L_1$) being tangent to the end of the initially passed pole ($P_a$) as seen in the direction of movement (R) and the other line ($L_2$) being tangent to the beginning of the pole passed thereafter of the poles following in the change sequence, compared to the total surface of a pole, of at last ⅛ and not more than the quotient of the number (z) of the displacement distance (v) to the bridging of a pole pitch (P) (pole subdivision number) minus one and the pole subdivision number.

7. The driving device according to claim 6, wherein the polarity of a pole to be changed and approached by a pole of constant polarity is equal to the polarity of the approaching pole of constant polarity, and the electromagnetic poles of the one part are controlled such that the polarity of the approached pole to be changed is changed to a polarity opposite the polarity of the cooperating pole of constant polarity at the instant at which the approaching pole of constant polarity covers the pole to be changed by an amount equal to the overlap.

8. The driving device according to claim 6, wherein the polarity of a pole to be changed and approached by a pole of constant polarity is initially opposite the polarity of the approaching pole of constant polarity, and the electromagnetic poles of the one part are controlled such that the polarity is changed to the same polarity as in a cooperating pole of constant polarity of the other part at the very instant at which the front edge of this pole of constant polarity coincides with the edge of the pole to be changed which lies closest in the direction of movement after a movement toward the pole to be changed, and the polarity of the approached pole to be changed is changed to a polarity opposite the polarity of the cooperating pole of constant polarity at the instant at which the approaching pole of constant polarity covers the pole to be changed by an amount equal to the overlap.

9. The driving device according to claim 1, wherein all poles of each pole group of the one part are designed as singular poles, have the same polarity among themselves at every moment and are simultaneously changeable in polarity.

10. The driving device according to claim 1, wherein each pole of each pole group of the one part has a polarity opposite the pole of the same pole group located immediately in front of it and that adjacent poles in each pole group are respectively joined in pairs and are designed as the poles of magnetic dipoles, all magnetic dipoles in each pole group being changeble simultaneously in their polarity.

11. The driving device according to claim 1, wherein the grouping of poles of the second part extending over the width covered by the pole groups of the first part consists of individual poles of constant polarity, at least one of which is respectively disposed adjacent each pole group of the first part.

12. The driving device according to claim 1, wherein the grouping of poles of the second part extending over the width covered by the pole groups of the first part is designed as a coherent magnetic strip of constant polarity extending across the total width.

13. The driving device according to claim 1, wherein pole groups of the first part which succeed one another directly in the polarity change sequence are located directly adjacent to one another.

14. The driving device according to claim 1, wherein pole groups which succeed one another directly in the polarity change sequence are respectively disposed alternately on both sides of a line extending in the direction of movement.

15. The driving device according to claim 1, wherein pairs of driving devices are positioned symmetrically on both sides of a line of symmetry extending in the direction of movement and are combined to form a complete device.

16. The driving device according to claim 1, wherein all poles of all pole groups have equally large, rectangular pole areas and have two edges extending parallel to the direction of movement.

17. The driving device according to claim 1 including a support wherein the pole groups of the first part are disposed on said support to produce rectilinear driving movement along the desired direction of movement and that the second part is disposed so as to be movable in the direction of movement relative to the first part.

18. The driving device according to claim 17, wherein the pole groups of the first part are disposed on said support in one plane and the second part is movable in the direction of movement parallel to the plane at a small distance from the pole group of the first part.

19. The driving device according to claim 17, including a hollow cylindrical support wherein the pole groups of the first part are disposed on the inner surface of said hollow cylindrical support along the generatrix thereof and the second part is designed as a coaxial cylinder located in the hollow cylindrical support with poles arranged on the outer circumference thereof, said cylinder being coaxially movable relative to the hollow cylindrical support of the first part.

20. The driving device according to claim 1, including a first support wherein the pole groups of the first part are disposed on said support to produce a rotational movement on circles concentric to a desired imaginary axis of rotation, and the second part is disposed to be rotatable about the desired axis of rotation relative to the first part.

21. The driving device according to claim 20, including a second support wherein the pole groups of the first part are positioned in concentric circles on said first support designed as a disc whose center lies in the imaginary axis of rotation and which extends perpendicular to the imaginary axis of rotation, and the second part on the second support is designed as a disc which is rotatable about the axis of rotation relative to the first support of the first part and on which the poles of constant polarity are located in groupings extending outwardly from the center.

22. The driving device according to claim 20, wherein said first support is a hollow cylindrical support and the pole groups of the first part are disposed on an inner surface of said hollow cylindrical support whose axis coincides with an axis of rotation along inner circumferential circles in proximate position in the axial direction, and the second part is a coaxial cylinder disposed in the hollow cylindrical support with poles correspondingly positioned on its outer circumference, said cylinder being supported to rotate about its axis lying in the axis of rotation relative to the first part.

23. The driving device according to claim 1, including first and second cylindrical supports wherein the pole groups of the first part are disposed on the outer circumference of said first cylindrical support along helical lines about the cylinder axis extending in the desired direction of movement in order to produce helical movement consisting of a rectilinear component of movement and a rotational component of movement, and the second part has said second support concentrically encompassing the cylindrical support of the first part, which supports poles of constant polarity disposed on its inner circumference corresponding to the arrangement of the pole groups of the first part and which is movable both axially as well as rotationally relative to the first part.

24. The driving device according to claim 1, wherein the current supply and polarity control of the electromagnetic poles is designed such that it is effected during the relative movement of the two parts respectively in response to the relative position of the poles of the second part with respect to the poles of the first part.

25. The driving device according to claim 24, including a control contact support, a sliding contact finger support wherein one of the two parts is connected with said control contact support having sliding contacts connected with the poles to be controlled, and the other of the two parts is connected with said sliding contact finger support having contact fingers which slide over the sliding contacts of the control contact support during the relative movement of the two parts, thereby producing a corresponding current input of a specific polarity of the poles to be controlled during each relative movement of the parts.

* * * * *